(12) United States Patent
Ulybin

(10) Patent No.: US 7,899,038 B2
(45) Date of Patent: Mar. 1, 2011

(54) METHOD AND APPARATUS FOR COMMUNICATING FAX DATA OVER THE INTERNET

(75) Inventor: Vladimir Ulybin, Rishon Lezion (IL)

(73) Assignee: AudioCodes Ltd., Lod (IL)

( * ) Notice: Subject to any disclaimer, the term of this patent is extended or adjusted under 35 U.S.C. 154(b) by 1042 days.

(21) Appl. No.: 11/395,393

(22) Filed: Mar. 30, 2006

(65) Prior Publication Data

US 2007/0229910 A1 Oct. 4, 2007

(51) Int. Cl.
| | |
|---|---|
| H04L 12/66 | (2006.01) |
| H04L 12/28 | (2006.01) |
| H04L 12/56 | (2006.01) |
| H04J 3/16 | (2006.01) |
| H04J 3/22 | (2006.01) |
| H04N 1/00 | (2006.01) |
| H04M 11/00 | (2006.01) |

(52) U.S. Cl. .................. 370/353; 370/392; 370/395.52; 370/401; 370/466; 358/400; 358/407; 358/425; 379/88.13; 379/88.14

(58) Field of Classification Search ................. 370/352, 370/353, 389, 392, 401, 395.52, 466; 358/407, 358/1.15, 425–426; 379/88.13, 88.14

See application file for complete search history.

(56) References Cited

U.S. PATENT DOCUMENTS 6,438,105 B1 * 8/2002 Qarni et al. .................. 370/231

(Continued)

FOREIGN PATENT DOCUMENTS

WO WO03065707 8/2003

OTHER PUBLICATIONS

Itu-T Recommendation T.38—Procedures for real-time Group 3 Facsimile Communications over IP Networks, Sep. 2005, pp. 5-17, 33, 37.*

"Procedures for Real-time Group 3 facsimile communication over IP networks" Itu-T Standard Superseded (T) International Telecommunication Union, Geneva,, CH, No. T38 2002 Amendmen Apr. 22, 2004, XP017403477.

European Search Report dated Jul. 5, 2007 for EP 07 10 4751.

*Primary Examiner* — Alpus H Hsu
*Assistant Examiner* — Jeremy Costin
(74) *Attorney, Agent, or Firm* — Eitan Mehulal Law Group

(57) ABSTRACT

Gateway, method, and apparatus for communicating fax data over the Internet. A gateway includes: a fax receiving module adapted to convert an analog fax transmission to a fax data set; and an Internet Protocol (IP) communication module adapted to encapsulate said data set using a first streaming protocol and b further encapsulate the encapsulated data set using a second streaming protocol; wherein the first streaming protocol comprises a fax relay protocol and the second streaming protocol comprises a real-time protocol; wherein encapsulation of said data set using the fax relay protocol comprises encapsulation of said data set into a payload of network packet comprising a fax relay protocol packet; wherein further encapsulation of said encapsulated data set using the real-time protocol comprises inclusion of said fax relay protocol packet into a higher layer payload of network packet comprising a real-time protocol packet; wherein the gateway is to transfer to a switched packet network a twice-encapsulated packet comprising said data set firstly encapsulated using the fax relay protocol and further encapsulated using the real-time protocol.

21 Claims, 8 Drawing Sheets

U.S. PATENT DOCUMENTS

| | | | |
|---|---|---|---|
| 6,483,600 B1* | 11/2002 | Schuster et al. | 358/1.15 |
| 7,395,309 B1* | 7/2008 | Lewis et al. | 709/200 |
| 2001/0007555 A1* | 7/2001 | Sasagawa et al. | 370/359 |
| 2002/0001373 A1* | 1/2002 | Sakurai | 379/100.12 |
| 2003/0123464 A1* | 7/2003 | Lee et al. | 370/401 |
| 2003/0193696 A1* | 10/2003 | Walker et al. | 358/402 |
| 2005/0047422 A1* | 3/2005 | Chen et al. | 370/401 |
| 2007/0153776 A1* | 7/2007 | Joseph et al. | 370/356 |
| 2007/0211302 A1* | 9/2007 | Wang et al. | 358/409 |

* cited by examiner

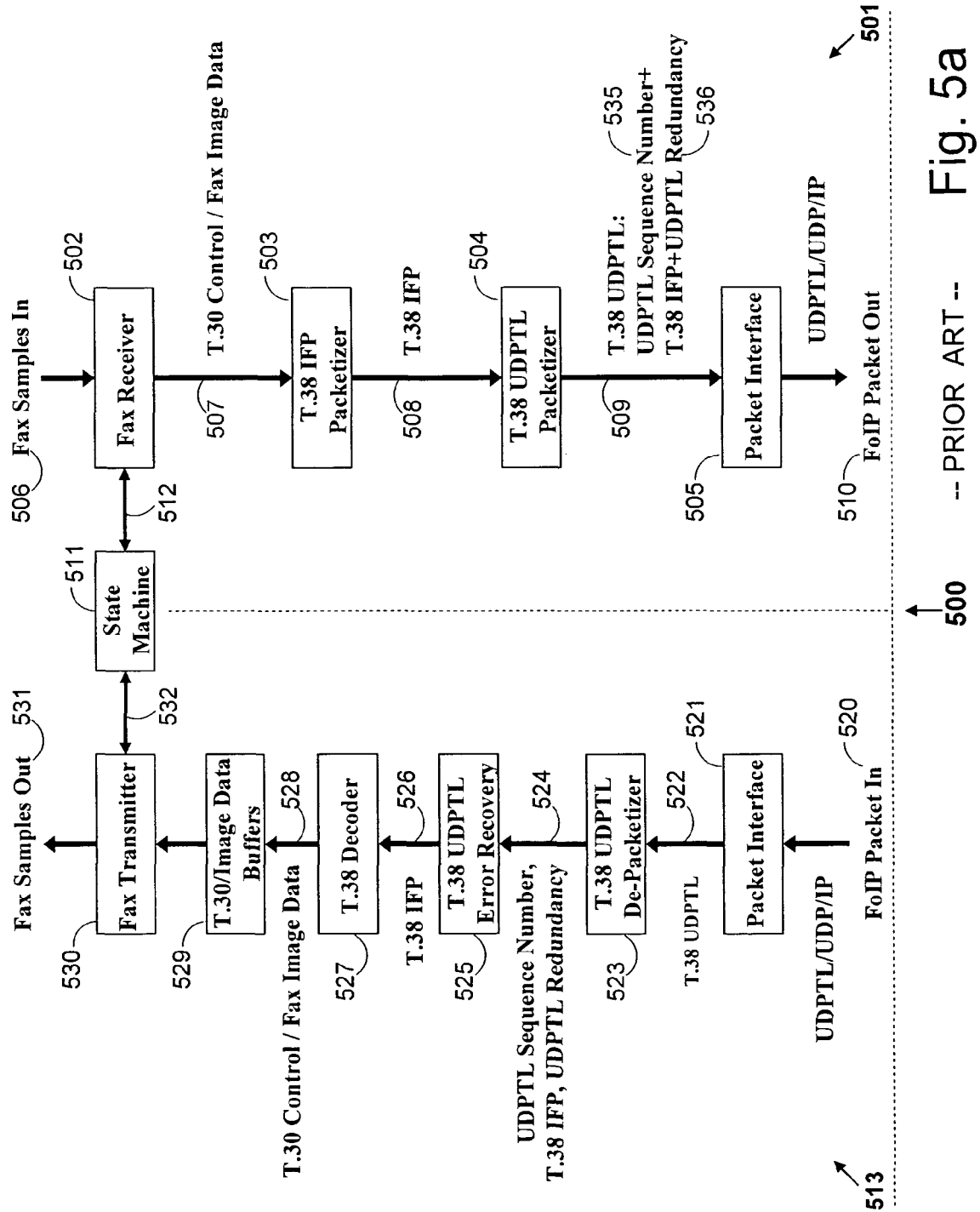
Fig. 5a -- PRIOR ART --

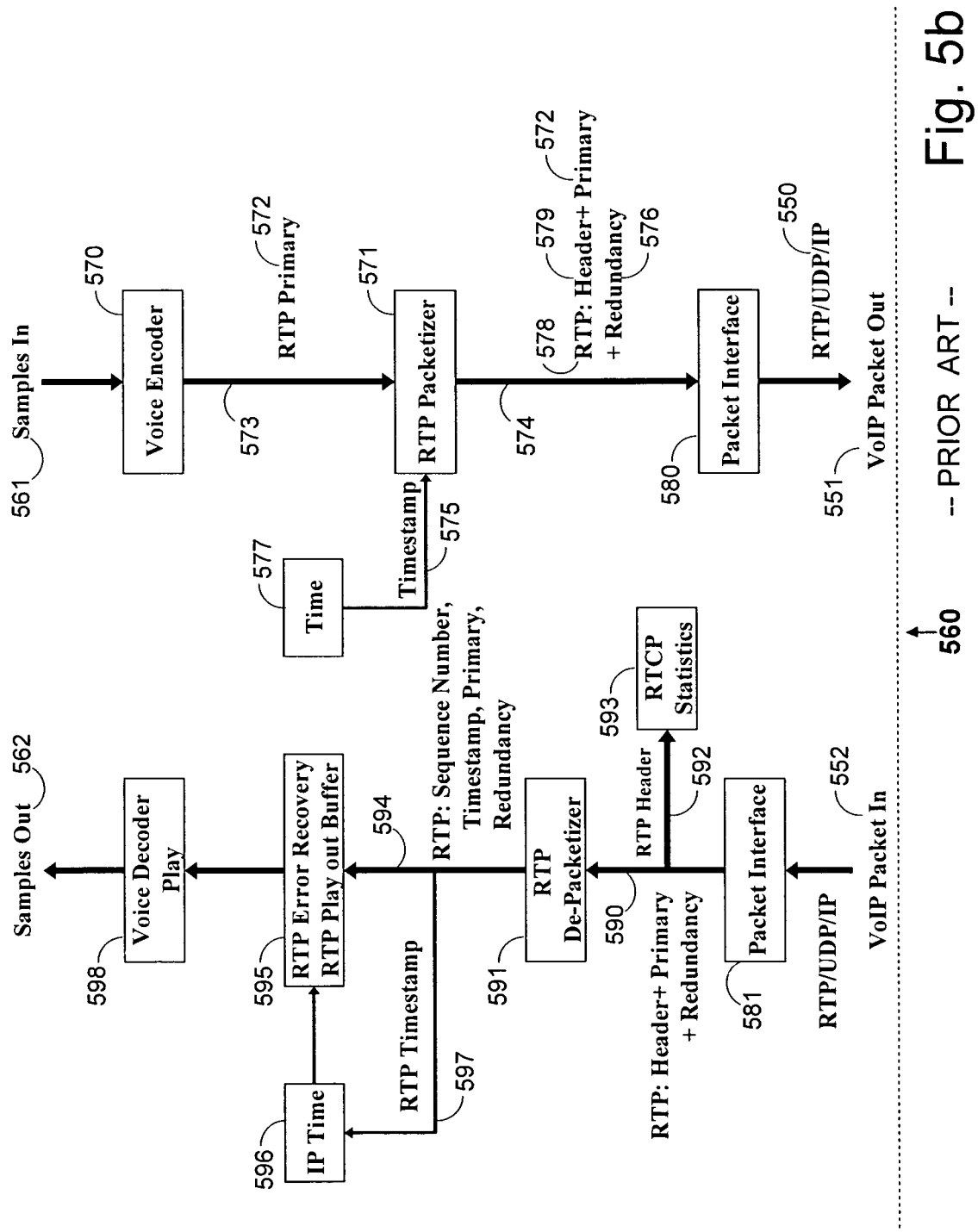
Fig. 5b -- PRIOR ART --

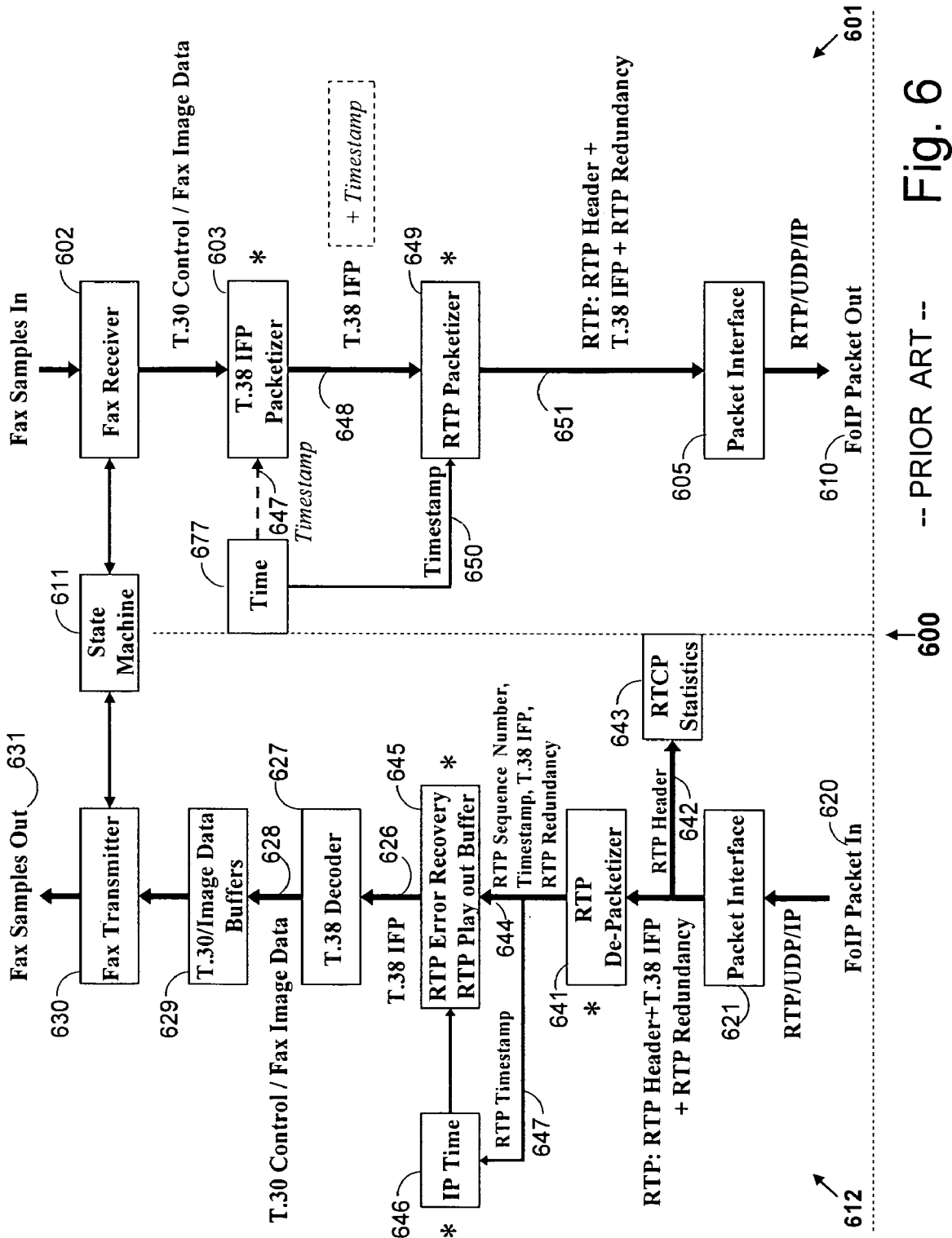
Fig. 6 -- PRIOR ART --

METHOD AND APPARATUS FOR COMMUNICATING FAX DATA OVER THE INTERNET

FIELD OF THE DISCLOSURE

The present disclosure generally relates to the field of communication systems. More specifically, the present disclosure relates to a method and apparatus for communicating a facsimile data over the Internet.

BACKGROUND

Wide area networks (WANs) are used to connect local area networks (LANs) together, so that users and computers in one location can communicate with users and computers in other locations. Owing to the ongoing development/proliferation of WANs, such as the Internet and similar Internet Protocol ("IP") based networks (hereinafter more generally referred to as "IP networks"), more and more people use IP networks to exchange various types of information such as data, video and audio—including voice and fax calls (which are herein defined as any call(s) correction(s) which permit or actually transmit or receive signals corresponding to any one or more of the aforementioned types of information, all of which are more generally referred to herein as "fax calls"). Since communication of fax calls between two suitable (herein sometimes called "fax") machines over IP networks typically involves transmission and reception of fax tones and fax data through gateways, such gateways are adapted to handle both fax over Internet Protocol ("FoIP") and other information, such as voice over Internet Protocol ("VoIP") communications. Therefore, gateways typically include a fax relay for enabling such fax calls, and speech coder and voice band data ("VDB") paths for enabling verbal and modem communications.

In a communication network, the term "gateway" (also called protocol converter) generally refers to a network node that is equipped for interfacing with another network that uses different protocols. A gateway is commonly positioned at a common intersection between a Local Area Network ("LAN") and a WAN, and it may contain devices such as protocol translators, impedance matching devices, rate converters, fault isolators, or signal translators as necessary to provide system interoperability. A protocol translation/mapping gateway interconnects networks with different network protocol technologies by performing the required protocol conversions. Routers are special cases of gateways. More about gateways may be found in "Access Gateways" (International Engineering Consortium, 2005).

Because of the different features and requirements that are involved in fax and voice communications, two different types of packet streams are typically independently used in two different modes of operations. The first type of packet stream is used in VoIP communications and is known as a real-time transfer protocol ("RTP") packet stream. An International forum called the Audio Video Transport ("AVT") Internet forum defined the RTP protocol in several Request For Comment ("RFC") specifications, for different media types and purposes. For example, common RFCs for VoIP are RFC 3550 ("A Transport Protocol for Real-Time Applications"), which obsoletes RFC 1889, RPC 2198 ("RTP Payload for Redundant Audio Data"), RFC 2733 ("An RTP Payload Format for Generic Forward Error Correction") and RFC 2833 ("RTP Payload for DTMF Digits, Telephony Tones and Telephony Signals").

Typical signals that are transferred over the RTP path are voice signals, dual-tone multi-frequency ("DTMF") signals, channel-associated signaling ("CAS"), modem signals that are relayed according to RFC 2833 specification(s) or transferred in Voice-Band-Data ("VBD") mode, video signals and the like. A RTP path, which may be used for processing RTP and RTP-related data, may include use of procedures that facilitate the encryption and/or protection of streams of packet loss, packets reordering and other procedures. Switching between different types of RTP streams (for example, regular voice, DTMF, VBD and video data) is performed in real-time by using payload types (as unique stream identifiers) transferred within (encapsulated in) RTP headers. Usually, switching between different types of RTP streams does not require any real-time negotiation between gateways involved in the communication session.

Attempting to utilize RTP path as is (without adaptation) to communicate fax data typically results in rendering the devices involved in the communication (the gateways and fax machines, for example) significantly less reliable and less interoperable. Therefore, a different type of a packet stream is involved in FoIP communications, which is known to a person with skill in the art as a "T.38 packet stream". T.38 packet streams are processed in a T.38 path. The term "T.38 path" generally refers to an electronic circuit which may be located or associated with a gateway and an associated processing routine that are involved in the processing (encoding, decoding, recovery and so on) of a fax relay data stream (T.38 packet stream). A T.38 data packet is formatted according to T.38 Recommendations and relayed over IP networks by using TCP or UDPTL. A T.38/TCP protocol which introduces large delays of fax signals is seldom used and, therefore, this type of protocol will not be referred to hereinafter. The T.38/UDPTL transport includes procedures that facilitate the protection of streams of packet loss and packet reordering for enabling the communicating gateways to independently correct T.38 stream errors. These procedures include the use of UDPTL sequence numbers and error protection scheme(s). A typical error recovery method used in T.38 UDPTL includes using a redundancy feature that utilizes "secondary packets". Another UDPTL error recovery scheme utilizes parity forward error correction ("FEC"). The latter mentioned two procedures or schemes are more fully described in the T.38 Recommendation.

Each type of packet stream has advantages and drawbacks, as more fully described hereinafter. For example, the T.38/UDPTL protocol is a well-known protocol that has long been in extensive use by fax relays, and it has an advantage that gateways and fax machines from different vendors introduce high interoperability, which means that different gateways/fax machines and the like can exchange fax messages in a convenient way, regardless of the vendor of the device (gateway, fax machine and the like) involved in the communication. In addition, T.38/UDPTL allows duplication of UDPTL packets for ensuring that at least one packet of its kind will be received intact at the receiving (remote) gateway or other device. For example, a gateway may generate five copies, or replicas, of a packet and successively forward them over the IP network to a receiving gateway, which will probably receive the original packet, or at least one of its replicas. However, as opposed to the RTP protocol, the T.38/UDPTL protocol does not allow encryption, which may render information susceptible to interception. In addition, UDPTL packets are not time stamped and, therefore, no communications-related statistics may be calculated, or evaluated, though this is usually not as critical in fax communications as it is in cases of real-time audio applications.

Regarding RTP packet streams, each RTP packet within a transmitted stream is assigned a unique sequence number and timestamp that may be utilized by the receiving gateway to calculate packets' statistics, evaluate the quality of the communication path and collate (reorder) packets that were received out of order. For example, statistics calculations may relate to the travel time of packets that arrive at the gateway, delay, jitter and so on. In addition, RTP allows encryption of data and, thus, it offers an improved security of communicated data. However, assigning (as by the gateway) a unique sequence number to each RTP packet also has a drawback, which is its inability to duplicate packets.

RTP and T.38 packet streams are generally handled by the gateways independently of one another. Regarding a given gateway at a given communication state, either an RTP packet stream or an T.38-type packet stream may be handled by the gateway, but not both types at the same time. Put differently, if a fax machine operates as a telephone (or as a fax machine), the gateways involved in the voice (or in the fax data) communication will enable the RTP path (or the T.38 path) while disabling the T-38 path (or the RTP path), respectively.

Therefore, whenever a fax call involves transmission of voice signal/fax tones and fax data, the gateways involved in the fax call have to switch from one mode of operation (such as RTP or T.38) to the other mode of operation (T.38 or RTP). That is, these gateways will, at times, enable the RTP path to handle a RTP packet stream (the VoIP part of the call), while disabling the T.38 path, and, at other times, they will enable the T.38/UDPTL path to handle a T.38 packet stream (the FoIP part of the call), while disabling the RTP path. The term "disabling the T.38 (or RTP) path", refers to disabling an electronic circuit and/or (depending on the communication progress and application type) a software module/element that are normally involved in the processing of the T.38 (or RTP) data stream. In order for the gateways involved in the communication session to correctly switch between a RTP mode of operation and a T.38 mode of operation, the gateways may initiate a real-time negotiation by using a special protocol or auxiliary commands that may be forwarded to the gateways by a media gateway controller, for example, to inform, or notify, the gateways about the expected type of data stream that is about to arrive at the gateways. In cases where a gateway forwards both RTP and T.38 packets streams (not at the same time) via the same destination port, such a real-time negotiation is mandatory.

Transitions between RTP to T.38/UDPTL modes of operations are problematic because there is a need to timely enable/disable different circuitry and processes that are involved in each mode of operation, in addition to enabling/disabling circuitry and processes that are involved in real-time negotiations between two gateways, as is more explained hereinafter.

In order to eschew transitions between RTP (or T.38) and T.38 (or RTP) modes of operation, attempts have been made to combine T.38 functionality and RTP functionality. According to a newly suggested T.38-based protocol, a T.38 IFP primary packet (within a T.38 IFP packet stream) is to be encapsulated in RTP with a RTP header and optional RTP redundancy or FEC to form a T.38/RTP (IFP over RTP, or IFP/RTP for short) protocol, as opposed to the T.38/UDPTL (or IFP/UDPTL) protocol. The new protocol (T.38/RTP) has several advantages over the T.38/UDPTL, as described hereinafter. For example, the T.38/RTP protocol enables secured fax relay transport by using secure RTP ("SRTP") which is a communication standard commonly used by different types of RTP media.

In addition, the newly suggested T.38/RTP protocol enables relatively fast transitions between voice (audio over RTP) and fax (IFP packets over RTP) packet streams by automatically distinguishing between the different types of RTP payloads without spending time for real-time negotiation between the two communicating gateways, as opposed to T.38 UDPTL protocol.

In addition, RTP encapsulation allows utilizing RTP Control Protocol ("RTCP") for statistics evaluations. RTCP is defined in RFC 3550. RTCP stands for Real-time Transport Control Protocol, and it provides out-of-band control information for a RTP packet stream. The primary function of RTCP is to provide feedback on the quality of service being provided by RTP, by periodically transmitting control packets to participants in a streaming multimedia session. It gathers statistics on a media connection and information such as bytes sent, packets sent, lost packets, jitter, feedback and round trip delay. An application may use this information to increase the quality of service, for example by limiting data flow, or by using a low compression codec instead of a high compression codec.

According to the new T.38/RTP protocol, primary IFP packets eschew T.38 UDPTL formatting and pass via RTP path instead, as if they were a real-time media data/signal. To implement the new T.38/RTP protocol, the RFC 3550 is used instead of T.38 UDPTL. For enhancing the protection of facsimile communication and recovery of lost packets, and for enabling collation of (reordering) packets, the T.38 standard recommends using an optional redundancy means as specified by RFC 2198, or, alternatively, by using FEC stream as specified by RFC 2733, the content of which is herein incorporated by reference.

The new T.38/RTP protocol also has several drawbacks. For example, using IFP/RTP often results in significant increase in the consumption of computational resources, comparing to T.38/UDPTL. In part, the need to use more computational resources results from the attempt to overcome discrepancies between different RTP and T.38/UDPTL requirements, which exist because the RTP protocol was not originally designed to cope with fax data communications. In addition, the interoperability offered by the IFP/RTP protocol may be poorer in comparison with the IFP/UDPTL protocol because of application of timestamps to fax data. Other drawbacks of the suggested IFP-over-RTP (IFP/RTP) protocol will be apparent from the description of the figures.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantageous or improvements.

As part of the present disclosure there is provided a system for communicating fax data over a packet switched network such as the Internet. In computer networking and telecommunications, packet switching is the now-dominant communications paradigm, in which packets (units of information carriage) are individually routed between nodes over data links which might be shared by many other nodes. Generally, the present disclosure involves encapsulation of a fax data set using a first streaming protocol, to obtain a fax packet, and further encapsulation of the fax packet using a second streaming protocol. The first streaming protocol may be, for example, any type of fax relay protocol, and the second streaming protocol may be, for example, any type of real-time protocol.

According to some embodiments the system may include a transmitting gateway that is adapted to receive a fax signal from a source fax machine, generate from the fax signal, via T.38 path, a T.38 UDPTL packet, encapsulate the resulting T.38 UDPTL packet, via RTP path, with a RTP header, and to send the resulting RTP-encapsulated T.38 UDPTL, packet to the packet switched network. The system may also include a receiving gateway adapted to receive, from the packet switched network, and de-encapsulate RTP-encapsulated T-38 UDPTL packet, via RTP path, and to generate, via T.38 path, a corresponding fax signal and to send the corresponding fax signal to a target, or recipient or intended, fax machine.

As part of the present disclosure there is provided a gateway for transmitting fax data over a packet switched network such as the Internet. According to some embodiments the transmitting gateway may include an inbound T.38 path adapted to receive a fax signal from a fax machine, process the fax signal for generating a T.38 UDPTL packet, encapsulate the resulting T.38 UDPTL packet with a RTP header in a RTP path, and to send the RTP-encapsulated T.38 UDPTL packet to the packet switched network, for example via a packet interface.

As part of the present disclosure there is provided an apparatus for transmitting fax related data over packet switched network such as the Internet. According to some embodiments the apparatus may include a controller adapted to encapsulate a T.38 UDPTL packet with a RTP header and to send the resulting RTP packet to the packet switched network. According to some embodiments the apparatus may receive fax related data over the packet switched network. According to these embodiments the controller may be also adapted to receive a T.38 UDPTL packet encapsulated with a RTP header and to de-encapsulate the RTP-encapsulated T.38 UDPTL packet. According to some embodiments the apparatus may be an Internet Aware mobile phone, or Internet Aware fax, or Internet Aware modem.

As part of the present disclosure a method is provided for processing an incoming fax data. According to some embodiments the method may include encapsulating a T.38 UDPTL packet with a RTP header. The method may further include transmitting the RTP-encapsulated T.38 UDPTL, packet to a packet switched network such as the Internet.

As part of the present disclosure a method is provided for receiving a fax data from a packet switched network such as the Internet. According to some embodiments the method may include receiving a RTP-encapsulated T.38 UDPTL packet from the packet switched network and de-encapsulating the packet from the internet protocol header and thereafter from the UDP header.

As part of the present disclosure the payload of an RTP packet may include substantially any type of fax data other than T.38 UDPTL type fax data. That is, substantially any type of fax data other than fax data complying with the T.38 UDPTL protocol may be encapsulated with a RTP header. More generally, the payload of an RTP packet may include a Fax Relay Protocol (FRP) packet, a FRP type fax data, which may be processed in an inbound FRP path in a transmitting gateway (or other device), and in an outbound FRP path in a receiving gateway (or other device). The term FRP (fax relay protocol), as used in connection with the present disclosure, refers to fax communication over a packet switched network and, in particular, FRP is meant to encompass substantially any FRP known today (T.38 UDPTL, for example) and any FRP that will be devised in the future. The FRP may include future extensions, enhancements and improvements of the existing T.38 UDPTL as well. The FRP packet, as used in connection with the present disclosure, is intended to include FRP primary data (for example, T.30 control and/or fax image data), error check data (for example sequence number), and optional error correction data. The FRP is assumed to be a highly reliable protocol for transferring fax relay information, and to allow design, development and use independently of RTP protocols or standards.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which:

FIG. 5a shows a block diagram of a conventional gateway for communicating a T.38 UDPTL (FoIP) packet whose structure complies with the model shown in FIG. 2.

FIG. 5b shows a block diagram of a conventional gateway for communicating RTP packet streams over an IP network;

FIG. 6 schematically illustrates an exemplary conventional gateway for communicating a FoIP packet whose structure complies with a packet model such as shown in FIG. 3;

Figure 1:
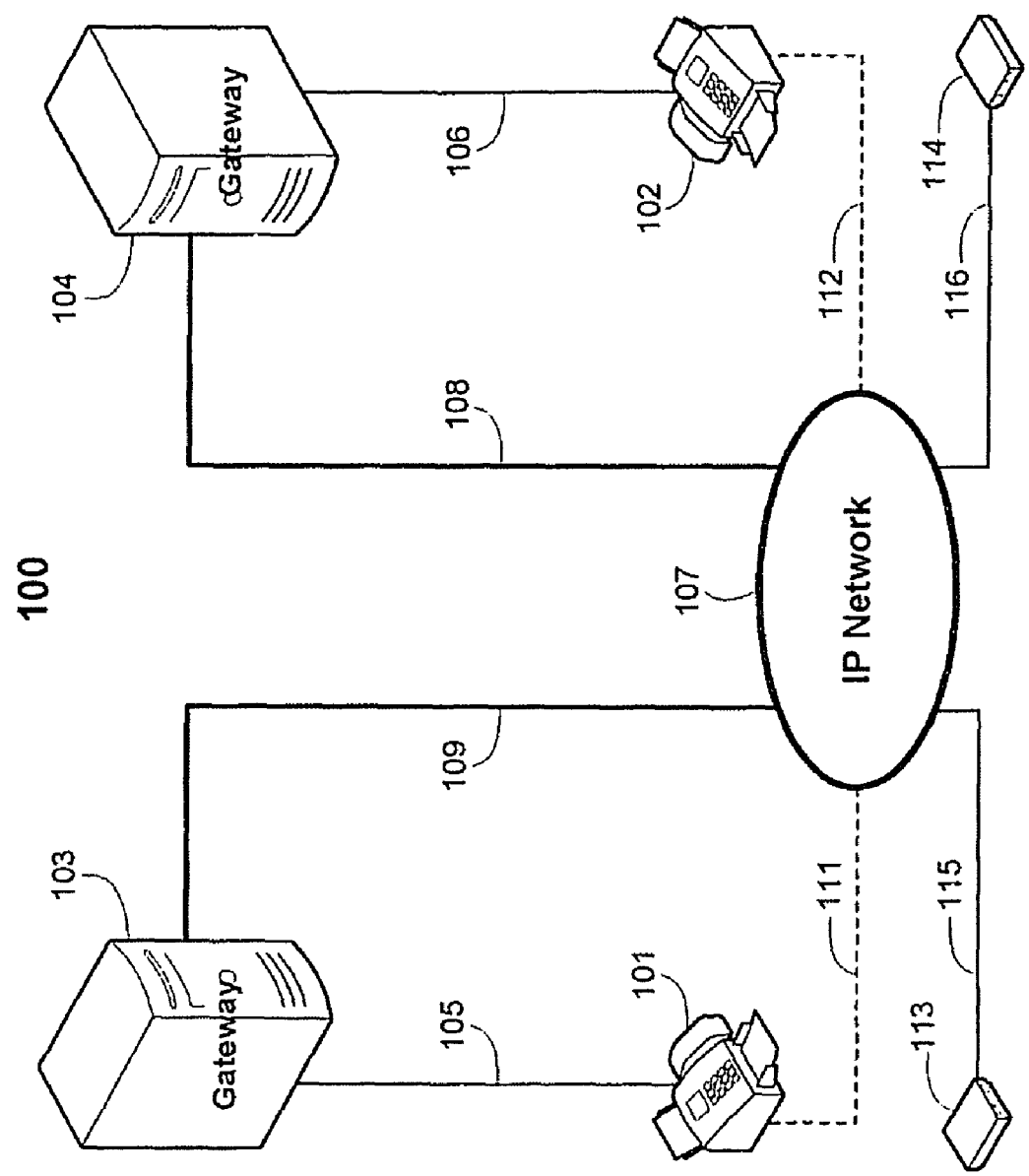
FIG. 1 schematically illustrates an exemplary basic FoIP/VoIP system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The present disclosure may take the form of an entirely hardware embodiment, an entirely software embodiment or an embodiment containing both hardware and software elements. In a preferred embodiment, the disclosure is implemented in software, which includes but is not limited to firmware, resident software, microcode, and so on.

Embodiments of the present disclosure may include apparatuses for performing the operations described herein. This apparatus may be specially constructed for the desired purposes, or it may comprise a general purpose computer selectively activated or reconfigured by a computer program stored in the computer.

Furthermore, the disclosure may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code has to be retrieved from bulk storage during execution. Input/output or I/O devices (including but not limited to keyboards, displays, pointing devices, and so on) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present disclosure are not described with reference to any particular programming language. It will be appreciated that a variety of programming languages may be used to implement the teachings of the disclosures as described herein.

In order to minimize packet losses and facilitate the re-ordering of packets received at a gateway, a transmitting gateway may transmit to the IP network auxiliary redundant packets in separate packet streams or within the same stream together with the primary packet being sent. A primary packet is a packet that includes a portion of the data/information itself. An auxiliary packet may also be called a secondary packet, repeated packet, redundant packet or FEC packet, depending on the protection method/protocol used. For example, in T.38/UDPTL, redundant packets may include secondary (repeated) packets and/or FEC messages. In RTP, the secondary packets are called redundant packets, and FEC specifically refers to forward error correction packets. In the absence of such auxiliary data/information, the packets consist of only primary packets, which are provided encapsulated with RTP headers.

Referring now to FIG. 1, it schematically illustrates an exemplary basic FoIP/VoIP system (generally shown at 100). Exemplary FoIP/VoIP system 100 is shown consisting of two fax machines (shown at 101 and 102), two gateways (shown at 103 and 104), and an IP network 107. In a more general way, each one of devices 101 and 102 may be any IP-enabled device that is capable of forwarding/receiving UDPTL/RTP packets to/from a data network. However, for sake of simplicity, devices 101 and 102 will be referred to hereinafter simply as a fax device or a fax machine.

Traditionally, fax machines have been designed to make fax calls via a public switched telephone network ("PSTN"). The way such fax calls are managed and traverse the PSTN infrastructure is defined in the International Telecommunications Union—Telecommunications ("ITU-T") division Recommendation T.30 ("*Procedures for document facsimile transmission general switched telephone networks*"), herein incorporated by reference. In general, fax machines, such as fax machines 101 and 102, employ modulation schemes for allowing fax calls traversals via PSTN, for example. For example, a fax call initiated by fax machine 101 or 102 may traverse PSTN line connections 105 or 106 on its way to gateway 103 or 104, respectively. However, for enabling FoIP calls; that is, to forward a fax call over IP network 107, the signal output by a fax machine has to be translated into a bit stream suitable for transmission over IP network 107. The translation is performed by a media gateway that is connected on one hand to the fax terminal (typically via a PSTN interface), and, on the other hand, to the IP network. For example, gateway 103 (or 104 for that matter), which is connected to fax machine 101 via PSTN connection line 105 (or 106), translates the signal output of fax machine 101 (or 102) into a bit stream suitable for transmission over IP network 107. Gateways 103 and 104 are connected (shown at 109 and 108, respectively) to IP network 107 in order to forward to IP network 107 the corresponding bit streams. IP network 107 may be the Internet, though other types of IP networks, or packet switched networks, may be used. In cases where fax machines 101 and 102 are IP-enabled, fax machines 101 and 102 may directly forward packets to, and receive packets from, data network 107, via network connections 111 and 112, respectively.

The translation performed by a gateway such as gateways 103 and 104, involves demodulation of incoming sampled signal by a fax (relay) receiver within the gateway, packetization of the demodulated data according to the used fax relay protocol ("FRP"), and transmittal of the FRP packets to the IP network, towards a destination (receiving) gateway. The receiving gateway typically includes a fax relay transmitter that re-modulates the received FRP packets according to modulation schemes that are defined in the ITU-T Recommendation T.30. The re-modulated signal is then forwarded from the gateway to the intended/recipient fax machine, where it is demodulated to extract the original message/data sent by the transmitting fax machine.

Fax relays are known for reliably carrying out end-to-end fax communications over IP networks. The communication protocol for FoIP systems is described in ITU-T Recommendation T.38 ("*Procedures for real-time Group 3 facsimile communication over IP networks*"), herein incorporated by reference. In general, ITU-T T.38 is a set of rules defining the FoIP call establishment and the packet format for transferring different signals of G3-type fax calls.

The FoIP part of gateways enables exchange of signals between two communicating fax machines, such as fax machines 101 and 102, in such a way that the fax machines will be able to complete the fax call/session without error alarms. A FoIP gateway also enables an answering fax machine to receive analog signals from the gateway, with which it is in communication, and extract binary information transferred to it by using a protocol procedure known as the "In-Message" procedure. The answering fax machine may then interpret the received analog signals as intended by the originating fax machine. Typically, fax relay gateways (such as gateways 103 and 104) detect, demodulate and re-modulate all types of fax signals from the beginning of, and during the entire, fax call.

Devices 113 and 114 are Internet aware devices that may be a mobile phone, fax device or modem. Internet aware devices 113 and 114 may have send and/or receive fax functionality to enable them to communicate, or exchange, fax related data or information, for example with one another, with fax machine 101 or 102, or with other IP fax-enabled devices (not shown). Internet aware devices 113 and 114 may forward packets and/or received packets from IP Network 107, via connection lines 115 and 116, respectively, for example. Internet aware devices 113 and 114 may forward (and/or receive) fax images in different image formats.

Traditionally, the VoIP part of a gateway, such as gateways 103 and 104, processes input and output voice band signals at 8 kHz or higher sampling rate. Gateways exchange the signals with analog devices via interface circuits. It is assumed that each device in FIG. 1 includes a suitable input-output (I/O) interface, echo canceling circuit(s) and call/signal discrimination circuit(s), and it utilizes a proper call establishment and other pre-/post-processing procedures, though these circuits and procedures are not part of the disclosure and, therefore, they are not referred to herein. Typically, the input samples represent a sine waveform (carrier) signal modulated by a digital bit stream according to a standard modulation scheme. The modulating bit stream may contain useful information such as fax capabilities, commands, responses, image bit map, transferred binary file, mixed raster content, and so on.

Figure 2:
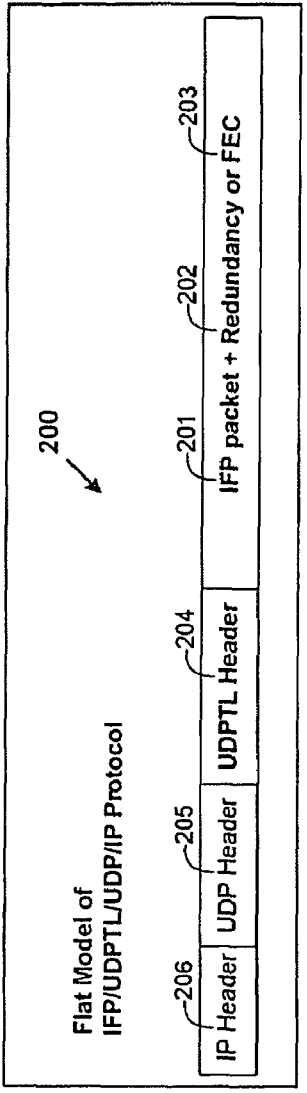
FIG. 2 (prior art) shows the general structure of an IFP/UDPTL/UDP/IP packet, which is conventionally used in fax communications.

Referring now to FIG. 2 (prior art), it shows a general structure (shown at 200) of an IFP/UDPTL/UDP/IP packet, which is used in fax communications. The model shown in FIG. 2, which is one of the first fax-relaying models and the most used one, is described hereinafter in association with FIG. 1. In order to transmit a fax communication from fax machine 101 to fax machine 102 of FIG. 1, fax machine 101, which generates the fax signal (the modulated data of T.30 control or scanned fax image), forwards the generated fax signal to gateway 103 of FIG. 1 with which it is in communication (via PSTN line connection line 105, for example). Gateway 103 packetizes the fax data/signal forwarded to it, to form IFP packets. Then, gateway 103 encapsulates each IFP packet 201 (optionally with redundancy packets 202 or FEC message 203) with a UDPTL header 204. Gateway 103 further encapsulates the UDPTL-encapsulated packet with a user datagram protocol ("UDP") header 205. Finally, gateway 103 further encapsulates the UDP-encapsulated packet with an IP header 206. Gateway 103 may then forward the resulting data packet 200, which may be one packet among several like-encapsulated packets, to IP network 107, via network connection 109. The receiving gateway (gateway 104 in this example) may receive data packet 200, de-encapsulate it and forward corresponding fax data/signals to fax machine 102.

Figure 3:
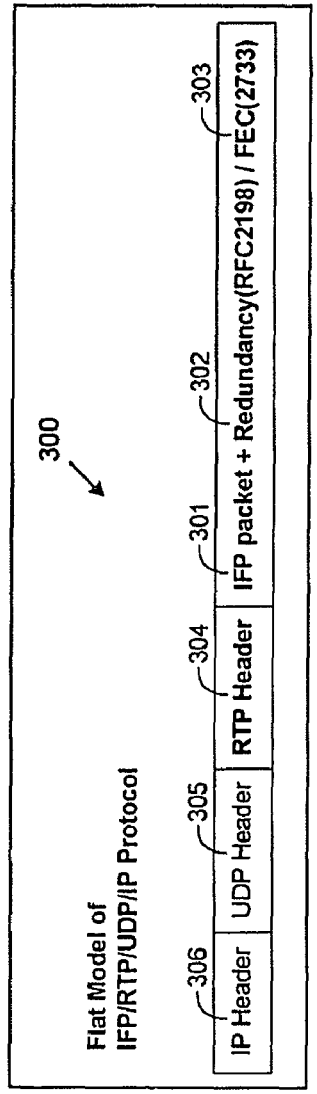
FIG. 3 (prior art) shows the general structure of an IFP/RTP/UDP/IP packet.

Referring now to FIG. 3 (prior art), it shows a general structure of an IFP/RTP/UDP/IP packet that is used in fax communications. As was explained hereinbefore, the RTP protocol was originally designed for communicating real-time media, which constitutes the RTP payload. However, when the RTP protocol is used to communicate fax data/signals (such as in the form of IFP packet 301, as recently suggested by the ITU-T, then IFP packet 301, along with (optional) redundancy packets 302 or FEC information 303, constitutes the RTP payload. The models shown in FIGS. 2 and 3 differ in the first encapsulation stage. That is, instead of encapsulating the fax data/signal (for example fax data/signal 201) with UDPTL header, such as with UDPTL header 204 (as shown in FIG. 2), the fax data/signal (for example fax data/signal 301) is encapsulated with a RTP header, such as with RTP header 304 (as shown in FIG. 3).

Another difference between the models shown in FIGS. 2 and 3 relates to their error recovery data formats. That is, UDPTL allows use of Redundancy or parity FEC frames generated according to T.38 UDPTL, whereas RTP allows use of Redundancy data as specified by RFC 2198 (at 302), or FEC data as specified by RFC 2733 (at 303).

As part of the protocol, the RTP header (for example RTP header 304) contains information related to the RTP payload. For example, the RTP header 304 contains information relating to the payload's source, size, and so on. The RTP packet, consisted of data elements 301 through 304, cannot be transferred as is over an IP network. To enable the transfer of the RTP packet it is necessary to encapsulate it with a UDP header 305, and to further encapsulate the resulting packet with an IP header (shown at 306). The resulting packet (shown at 300) may then be transferred over an IP network.

Encapsulating the IFP packet 301 (plus packets 302 and 303 as an option) with a RTP header 304 may be regarded as a "direct encapsulation", in respect of the IFP-RTP relationship, because the IFP packet, which may be thought of as a raw packet, is encapsulated, as is, with a RTP header. Transmission of T.38 IFP packets over RTP (referred to hereinafter as "T.38 IFP/RTP"), or utilization of direct encapsulation as schematically shown in FIG. 3, has several drawbacks as explained in details hereinafter.

Figure 4:
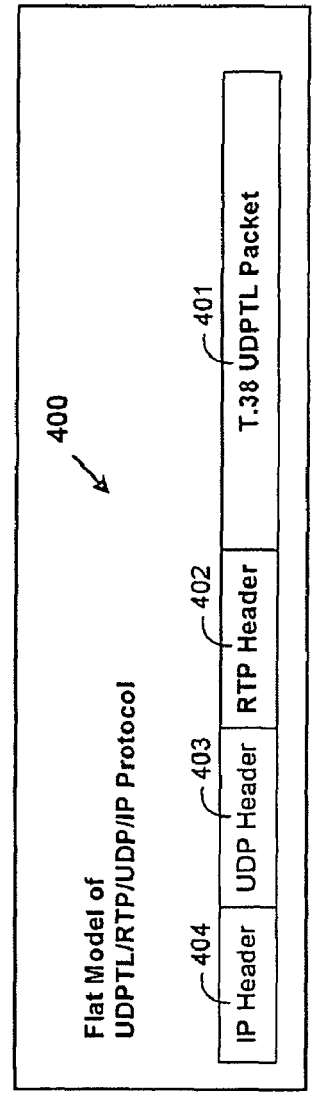
FIG. 4 shows the general structure of a T.38 UDPTL/RTP/UDP/IP packet according to some embodiments of the present disclosure.

Referring now to FIG. 4, it shows a general structure of a T.38 UDPTL/RTP/UDP/IP packet, according to some embodiments of the present disclosure. As opposed to the direct encapsulation shown in FIG. 3, FIG. 4 shows an indirect encapsulation method, according to which an IFP packet is first encapsulated with a UDPTL header, whereby to form a standard T.38 UDPTL packet (at 401). Then, the T.38 UDPTL packet 401, which may be thought of as consisting of elements such as elements 201 through 204 of FIG. 2, is encapsulated with a RTP header (at 402). Finally, UDP and IP encapsulations (403 and 404, respectively) are conventionally performed, to form a novel type of packet (at 400) which is transferable over an IP network.

It is noted that, in accordance with the present disclosure, whenever a fax is sent from a transmitting (source) gateway to a receiving (destination, or target) gateway, the RTP payload of packet 400 is a T.38 UDPTL packet, and, whenever a real-time data/signal is sent from the source gateway to the destination gateway, the RTP payload of packet 400 is typical to encoded voice, for example.

Regarding FIGS. 5a, 5b, 6 and 7, elements/units, packets, portions of a packet and processes are referred to in the description relating to a gateway transmitting a fax and RTP packets. However, they may also be referred to in the description relating to the same gateway in the context of receiving (from an IP network) a fax and RTP packets, respectively. In such cases, these elements/units, packets, portions of a packet or processes, should be construed as belonging to, or coming from, a different transmitting gateway.

Referring now to FIG. 5a, it shows a conventional gateway for communicating a T.38 UDPTL (FoIP) packet whose structure complies with the packet model shown in FIG. 2. A typical conventional gateway, such as gateway 500, is designed for handling both inbound and outbound fax and voice/audio communications. For the sake of the description relating to fax communications, Gateway 500 is shown including only the FoIP part which processes inbound and outbound fax data.

The inbound fax data/information processing path (shown at 501) of exemplary gateway 500 accepts fax samples from a source (such as an originating) fax machine (or the like, not shown), processes the samples and forwards a corresponding FoIP packet (in a T.38 UDPTL format). Fax Receiver 502 may accept a sampled fax signal (for example, at Fax Samples In 506) from an originating fax machine (not shown), demodulate the sampled signal and generate a corresponding T.30 control and fax data 507. T.38 IFP Packetizer 503 generates a T.38 IFP packet (at 508) from the T.30 control or fax image data (at 507). T.38 UDPTL Packetizer 504 encapsulates the T.38 IFP packet (at 508) to form a T.38 UDPTL packet (at 509) that includes a UDPTL sequence number, T.38 IFP and UDPTL redundancy packets. Finally, packet Interface 505 encapsulates the T.38 UDPTL packet (at 509) with an IP header to form a FoIP Packet Out 510, and forwards FoIP Packet Out 510 to the IP network (not shown).

In a gateway sending a fax packet stream to an IP network, T.38 UDPTL. Packetizer 504 generates a sequence number (of the UDPTL header) 535 for each new primary IFP packet. T.38 UDPTL Packetizer 504 may optionally add T.38 UDPTL Redundancy frames (at 536) or FEC frames (not shown).

The outbound fax data/information processing part (at 513) of exemplary gateway 500 is responsible for accepting from the IP network (not shown) a T.38 UDPTL packet (FoIP Packet In 520), processing the T.38 UDPTL packet and forwarding corresponding re-modulated fax signal to a destination (recipient) fax machine (not shown), o which the fax data is intended. FoIP Packet In 520, which arrived over an IP network (not shown) is received at Packet Interface 521, which de-encapsulates it to extract the T.38 UDPTL packet (at 522). T.38 UDPTL De-Packetizer 523 extracts from T.38 UDPTL packet 522 the UDPTL sequence number, T.38 IFP packet and Redundancy or FEC frames (at 524) and forwards them to T.38 UDPTL Error Recovery module 525 which utilizes them to reconstruct a substantially error-free T.38 IFP packet (at 526). The substantially error-free T.38 IFP packet 526 is then decoded by T.38 Decoder 527 to obtain T.30 control and fax image data (at 528). T.30 control and fax image data 528 may be stored in T.30/Image Data Buffers 529.

A gateway receiving a fax (T.38-type) packet stream detects packets loss, re-orders packets if they arrive to the gateway 500 out of order, and recovers packets lost in the IP network. The Fax Transmitter 530 re-modulates T.30/Image data 528/529 and forwards fax signals/tones (Fax Samples Out 531) to the recipient/intended fax machine according to ITU-T Recommendation T.30.

The fax relay State Machine 511 controls Fax Receiver 502 (shown at 512) and Fax Transmitter 530 (shown at 532). The State Machine 511 does not require timestamps to be transferred between communicating gateways. State Machine 511 takes into account the current status of Receiver 502 and Transmitter 530, types and amount of IFP data exchanged over IP network, and general rules of G3 fax operation as defined in the T.30 Recommendation. The function principles of fax relay State Machine are not a subject of this invention.

Referring now to FIG. 5b, it shows a block diagram of a conventional gateway for communicating RTP packet streams over an IP network. A gateway (for example gateway 560) sending an RTP type packet such as VoIP Packet Out 551, to an IP network (not shown) includes media source modules, such as a speech/voice encoder (Voice Encoder 570, for example), and a RTP packetizer such as RTP packetizer 571 Voice Encoder 570 encodes the signal input to it (Samples In 561) to generate there from a corresponding RTP primary packet information (shown at 572). The RTP Primary signal is then forwarded (shown at 573) to RTP Packetizer 571, which packetizes the RTP Primary signal to obtain RTP packet 578, with Header 579 and Primary packet 572 as a payload. Optionally, the payload may include Redundancy data 576. The Header 579 generated by Packetizer 571 may include, among other things, corresponding RTP payload type identifier, sequence number and timestamp that is generated and forwarded (shown at 575) by Time 577 to RTP Packetizer 571. If redundancy packets are included in the payload, then Header 579 may contain the list of timestamp offsets and payload types of each redundant packet relative to the primary packet. The RTP packet 579 is then forwarded (shown at 574) to Packet Interface 580, which encapsulates the RTP packet with a UDP header and, thereafter, with an IP header (shown at 550), whereby to generate a corresponding VoIP packet (VoIP Packet Out 551), which may then be sent to the IP network (not shown).

A gateway receiving an RTP packet typically detects packets loss, re-orders packets if they arrived at the gateway out of order, recovers packets that were lost in the network and builds/loads the "play out" buffer with data by using primary packets and timestamps and/or timestamp offsets. By "play out buffer" is meant a buffer from which stored voice/audio related data is retrieved/fetched and sent to an intended module in such a way that jitters are substantially avoided when the intended module "plays the data". The gateway may play the buffer by using a media module like a speech decoder (for example, Voice Decoder Play 598). Switching between different media types is done by the gateway autonomously, after it identifies the payload type as specified in the RTP header (for example Header 579).

A RTP packet, such as VoIP Packet In (552) may be received at Packer Interface 581, which may de-encapsulate it to extract the RTP packet (for example RTP packet 578). The RTP header (for example Header 579) may be forwarded (592) to RTCP Statistics 593 for statistics evaluations. The entire RTP packet is forwarded (at 590) to RTP De-Packetizer 591, for extracting the RTP payload: sequence number, RTP timestamps, primary packet and redundancy, which are used by RTP Error Recovery 595 for detecting packets loss, re-ordering packets (if they arrived at the gateway out of order), recovering packets that were lost in the network, and so on. IP Time 596 may use the RTP timestamp (shown at 597) (and/or timestamp offsets) for timely aligning primary packet payloads in the "play out" buffer 595, and for restoring, or recovering, the original sequence at which the remote gateway transmitted the payloads.

The gateway 560 plays the buffer by using RTP decoder process, which may be employed, for example, by a speech decoder such as Voice Decoder Play 598. In cases where synchronous (periodic) bit streams (for example, synchronous bit streams relating to compressed audio signal) are transmitted from a remote (transmitting) gateway to a receiving gateway, the voice decoder of the receiving gateway (for example Voice Decoder Play 598 of FIG. 5b) reads data from a play out buffer, such as Play out Buffer 595, using the bit rate close to the average bit rate of the data arriving at the receiving gateway. In cases where asynchronous data (for example, DTMF relay commands) are received at the receiving gateway, the decoder of the receiving gateway reproduces, regenerates, reconstructs or restores, the original time sequence by using timestamps received together with asynchronous data. The decoder's output signal may then be forwarded to the intended multimedia (not shown), in the form of sampled signal (Samples Out 562). By "original time sequence" is meant the time sequence assigned by the transmitting gateway to outbound data before sending the outbound data to the IP data network.

It is noted that a conventional gateway such as gateway 500 usually includes also the units shown in, and described in connection with, FIG. 5b, for enabling both fax and RTP communications. The FoIP and RTP parts of such a gateway are shown in different figures (FIG. 5a and FIG. 5b) only for the sake of clarity of the description.

Referring now to FIG. 6, it schematically illustrates an exemplary gateway for communicating a packet whose structure complies with the packet model shown in FIG. 3. Inbound path 601 of gateway 600 includes Fax Receiver 602, T.38 IFP Packetizer 603, Packet Interface 605 and State Machine 611, which function in the substantially the same manner as Fax Receiver 502, T.38 IFP Packetizer 503, Packet Interface 505 and State Machine 511, respectively, of FIG. 5a. As part of the RTP protocol, each one of the packets has to be time stamped before the packet is sent to the IP network, as explained before. Therefore, Time 677 (which functions substantially in the same manner as Time 577 of FIG. 5b) generates and forwards (shown at 650) time information to RTP Packetizer 649 for time stamping the entire RTP packet as a whole. As part of the RTP protocol, RTP Packetizer 649 forwards to Packet Interface 605 a RTP packet (shown at 651) consisting of a RTP header and T.38 IFP plus RTP redundancy packets as the RTP payload. Packet Interface 605 may then send the RTP packet (FoIP Packet Out 610), after it encapsulates it with a UDP and IP headers, to the IP network (not shown).

Outbound path 612 of gateway 600 may typically include input/output sample and packet interfaces that are commonly used by different types of media. The T.38 units 627, 629 and 630 that function in substantially the same manner as units 527, 529 and 530, respectively, of FIG. 5a. The RTP units 641, 643, 645 and 646 performing regular RTP packet processing similarly to the units 591, 593, 595 and 596, respectively, of FIG. 5b. Gateway 600 may also include the RTP path enabling units (both inbound and outbound paths) of FIG. 5b.

Problems Associated with Communications of T.38 IFP Packets Over RTP

Because the T.38 IFP/UDPTL protocol (as exemplified in FIG. 5a) was specifically designed for enabling FoIP communications, the T.38 IFP/RTP protocol (as exemplified in FIG. 6) is by far less reliable and interoperable in fax communications comparing to the T.38 IFP/UDPTL protocol. The T.38 IFP/RTP model has several drawbacks, as is described hereinafter. For example, T.38 an IFP packet stream is meant to be asynchronous in nature, for which reason a T.38 IFP packet is not time stamped while it is being processed by the fax relay in the source gateway. On the destination gateway, the fax relay is not seeking for timestamps for recovery of packets. That is, unlike in the RTP packetizer, T.38 transmitters and T.38 receivers do not timestamp packets. On the other hand, RTP type data streams, and specifically data streams complying with RFC 2198, are designed for synchronous communication and, as such, time stamping data packets plays a major role in the RTP model, for enabling correct playing at the decoder.

In addition, some features of T.38 UDPTL, for example packet duplications (a feature that is applied by the gateway transmitting the packets to the IP network to enable recovery of lost packet by the receiving gateway) and enabling of packets reordering, cannot be applied to T.38 IFP/RTP (see FIG. 6) due to conflicts with RTP protocols, as is described in details hereinafter.

Regular T.38 IFP Packetizer allows transmission of IFP packets by groups. Packets in any group may be generated simultaneously. However, as part of the RTP protocol, every packet is time stamped (shown at 647 in FIG. 6, for example) by Time 677 before it is further processed and transmitted to the IP network. Therefore, using T.38 IFP/RTP, as exemplified in FIG. 6, necessarily involves time stamping simultaneously transmitted IFP packets with the same transmission time. However, a problem exists, which lies in the discrepancy between the RTP protocol and the need to simultaneously time stamp the packets in a group, because, according to the RTP protocol, only one packet can be assigned a given timestamp. Therefore, simultaneous transmission of packets, which is a legitimate T.38 IFP feature, may cause RTP-wise discrepancy which will result in inability to correctly interpret T.38 IFR packets that were transferred over RTP, regardless of the extent of packet loss.

Returning back to FIG. 6, the problem of fax packet bursts/ groups, where some T.38 IFP packets have the same timestamp, may be solved if the T.38 IFP Packetizer 603 will have additional function (relative to regular T.38 IFP Packetizer 503) of queuing and distribution of T.38 IFP packets in time. The other solution of the packet burst problem is applying timestamps (647) at the stage of T.38 packetizing (603) with following use of these stamps by RTP Packetizer (649) instead of regular timestamps from Time 677. This solution is better than distribution of IFP packets in time because does not introduce additional delays, but it requires changes in two modules: T.38 IFP Packetizer (603) relative to regular T.38 IFP Packetizer 503 and RTP Packetizer (649) relative to regular RTP Packetizer 571.

Packet Streams: T.38 IFP Packet as Opposed to RTP Audio Packet

Some of the differences between a fax relay packet (T.38 IFP packet) stream and an audio packet (RTP audio packet) stream are described hereinafter. A RTP audio packet stream is usually full duplex and synchronous (mostly periodic). That is, each one of the two gateways involved in the communication periodically forwards audio related packets to the IP network. The gateway serving as the destination gateway, decodes (plays) audio packets synchronously with respect to the gateway serving as the source gateway. That is, the audio-related data stream is processed by both (transmitting and receiving) gateways at substantially the same bit rate because one goal of audio gateways is to deliver audio signals end-to-end with as minimum distortion and jitter as possible.

On the other hand, a T.38 IFP packet stream is typically a half duplex and asynchronous data stream, with pseudo-random packet transmission/reception intervals. A T.38 IFP packet stream may consist (occasionally for synchronous data) of bursts (groups) of packets, which may be simultaneously generated by the transmitting gateway, or T.38 IFP packet stream may have long temporal gaps, or windows, between consecutive packets.

Sequence Numbers in T.38 UDPTL and RFC 3550

In T.38 UDPTL, the sequence number of initial FoIP packet sent in the beginning of fax relay session should be zero and the sequence number of the successive transmitted packets is incremented by one per each new IFP primary packet that is output from a fax demodulator. However, if a T.38 IFP packet is replicated, the sequence number of replicated packet is not incremented relative to previously sent packet but, rather, replicated packet have the same sequence number as original packet which they replicate. In general, the UDPTL packet sequence number is used to identify the correct packets sequence in an arriving stream. Timestamps and time offsets are not required, nor are they used, by T.38 UDPTL, protocol. Therefore, a fax relay modulator is not obliged to restore the time sequence of fax signals that occurred at a remote fax demodulator (in a gateway transmitting T.38 packets). A gateway receiving T.38 packets is allowed to reject or substitute T.30 control messages/commands that it receives from a remote gateway. A fax relay modulator in a gateway receiving T.38 packets may transmit data/signal to a fax machine connected to it (for example over the PSTN) at a bit rate that is different from the bit rate at which the original fax message was forwarded to it via IP network. The output signals of T.38 module should comply with the procedures defined in T.30 Recommendation for facsimile transmission, which is the main requirement for fax relay transmitter to successfully facsimile communicate over IP network. The correct sequence of T.38 IFP packets received from a transmitting gateway has a significant meaning over timing sequence because even if a gateway transmits a signal sequence that is acceptable for G3 fax communication, but if the gateway loses binary data for modulation, the fax session may fail.

As opposed to T.38 UDPTL, and in compliance with RFC 3550, the initial sequence number assigned to the first RTP packet should be random and the RTP sequence number should be incremented by one for every next RTP data packet that is forwarded to the IP network by a transmitting gateway. Incrementing the sequence number is performed independently of the payload (media) type. Sequence numbers are used by the receiving gateway to detect packet loss and to restore packet sequence. However, detecting and recovering packet loss cannot be done by using only sequence numbers. For example, a gateway may send compressed audio and DTMF streams (having different payload types) to an IP network. A DTMF relay packet may get lost in the network whereas every packet relating to the compressed audio stream successfully reaches its destination (the receiving gateway, for example). The receiving gateway may detect packet loss but for identification of the media type stream suffering from packet(s) loss and for error recovery purpose, the gateway needs sections timestamps. The statistics associated with packets loss is based on the received sequence numbers, and may be reported to wherever it is required by using the standard RTCP protocol.

Timestamps

Fax relay gateways do not timestamp transmitted FoIP packets nor they require timestamps, when they receive a FoIP packet, for transmitting fax signals to the intended fax machine. As opposed to the T.38 protocol, every primary RTP packet has a timestamp in accordance with RFC 3550, and every redundant packet has a timestamp offset in accordance with RFC 2198. Timestamps and timestamp offsets are used by a RTP receiver for error recovery and reconstruction of signal flows for allowing RTP receiver to correctly play its play out buffer(s). In cases of packet loss during synchronous data transfer between gateways, the number of lost packets related to a specific payload type may be derived from timestamps, assuming that packets have fixed duration. However, timestamps are useless for packets lost during asynchronous data transfer or variable frame duration. To overcome the problem of lost packets during asynchronous data transfer, a receiving gateway uses media properties, media protocol enhancements or techniques that are much more complex than the ones described, or offered, in the RFC 3550 and RFC 2198 protocols. An example of asynchronous RTP transfer is associated with a DTMF relay having RFC 2833 specification designed for DTMF, telephone and simple modem signals. However, the AVT forum has not yet offered any RFC that is dedicated for fax relay data transfer, and a RFC which is much better than T.38 UDPTL is unforeseeable.

T.38 IFP Packet Duplication

In T.38 IFP/UDPTL, duplication of a fax packet enhances the reliability of the fax relay. Therefore, packet duplication can be implemented in respect of highly important packets, for example on packets relating to, or associated with, T.30 INDICATOR, T.30 DATA HDLC-OK/BAD, T.30 DATA SIGNAL-END and other.

As opposed to the T.38 IFP/UDPTL protocol, a T.38 IFP/RTP gateway cannot transmit packets without incrementing the RTP sequence number. Also, replications of IFP packet with incremented RTP sequence number cannot be used because the T.38 receiver will consider a repeated IFP data as a new binary data, and as a result of this, the T.38 fax modulator will transmit invalid binary information to the fax machine coupled to a gateway by a PSTN line, for example.

Multiple T.38 IFP Packets Generation at the Same Time Instant

As opposed to the RTP protocol, a T.38 packet stream may contain sequences of packets that are generated at substantially the same time instant. One reason for this is that fax signals, which contain both control information and data, have to be transmitted and received substantially at the same time, for allowing the receiving gateway to timely handle the inbound data stream by using the relevant control information. For example, packets relating to, or derived from, T.30 DATA HDLC-DATA and HDLC-OK/BAD may be generated and communicated substantially at the same time. Likewise, packets relating to, or derived from, T.30 DATA SIGNAL-END and T.30 INDICATOR NO-SIGNAL, may be generated and communicated substantially at the same time. Another reason why a T.38 packet stream may contain sequences of packets that are generated at substantially the same time instant is a difference existing between packetization interval(s), which a destination (receiving) gateway is able to process, and a working frame(s) duration of a sending (transmitting) gateway. For example, if a maximum packetization interval of a destination gateway is 10 milliseconds (ms), but the minimum frame duration of source gateway is 20 ms, then a transmitting gateway will transmit T.38 type data stream in bursts consisting of two or more packets. An IP-enabled fax machine may send packet bursts as well, because, unlike non-IP fax machines, IP-enabled fax machines do not perform, or use, signal de-modulation, and as a result, IP fax machines do not have to handle distribution of commands or data over time. Instead, IP-enabled fax machines deal with simple packet queues. T.38 IFP packets sent over RTP at the same timestamps may be rejected by a RTP receiver at the stage of reconstructing of play out buffer. Therefore, a normal T.38 session that is relayed over RTP may fail even in the absence of packet loss.

Redundancy Levels

During T.38 UDPTL fax relay session, the redundancy level of FoIP information may vary, for example, T.30 control commands and data may be transferred at higher redundancy level than redundancy level of fax image data. This is useful for better reliability when relaying T.30 control signals. In a case of T.38 IFP transferred over RTP, the variation of redundancy level is problematic because it requires T.38 IFP decoding (for understanding the type of transferred data) at the stage of RTP packetizing.

T.38 IFP Over RTP Implementation Problems

At the gateway level, the main difficulty associated with the implementation of T.38 IFP over RTP is the need to adapt, or modify, two relatively complex modules, the T.38 module and the RTP module, including adaptation of their performance/features. An adaptation may be required for all levels of the packet processing, including packet generation, packet receiving, recovering lost packets and re-ordering packets that arrive in "out of order" manner. In some cases, where fax receiver/transmitter and T.38 IFP encoder/decoder are physically implemented on different hardware elements (for example in DSP) than the RTP/UDPTL packetizer/de-packetizer (the latter may be implemented, for example, on PC), it may be impossible to change the "T.38 path" at the extent required for implementing the T.38 IFP over RTP. For IP-enabled phones and IP-enabled faxes machines, the T.38 IFP over RTP approach is also very problematic, because IP-enabled fax machines transmit/receive T.38 UDPTL packets without using timestamps, because such devices may not perform modem-like signal processing.

Alternative Protocols

In attempting to offer other solutions to the problems associated with transferring non-audio data over RTP, the AVT International forum has devised three protocols as an alternative to the RFC 3550 and RFC 2198 protocols: (1) RFC 2733, which specifies a way of using FEC data (already mentioned before), (2) RTP Retransmission Payload Format, which is described, for example, in "RTP Retransmission Payload Format", by J. Rey et al. (Internet-Draft, Sep. 15, 2005), the entire content of which is incorporated herein by reference, and (3) RTP over TCP, which is described, for example, in "Framing RTP and RTCP Packets over Connection-Oriented Transport", by John Lazzaro (Internet-Draft, Sep. 5, 2005), the entire content of which is incorporated herein by reference. However, using these protocols is also problematic in that they are more complex to use comparing to RFC 3550 and RFC 2198, and, in addition, a fax relay and RTP modules are harder to adapt to one another, structurally and functionally, when using any one of these three protocols.

An attempt was made by Satish Mundra (Texas Instruments, Inc.) to define a new format for non-audio data by using RFC 2198 redundancy scheme. This attempt is described, for example, in "A RTP Payload for Redundant Non-Audio Data" (Internet-Draft, Jun. 7, 2004), the entire content of which is incorporated herein by reference. The problem for IFP/RTP fax relay is that this protocol requires significant modifications in the T.38 and RTP modules.

Figure 7:
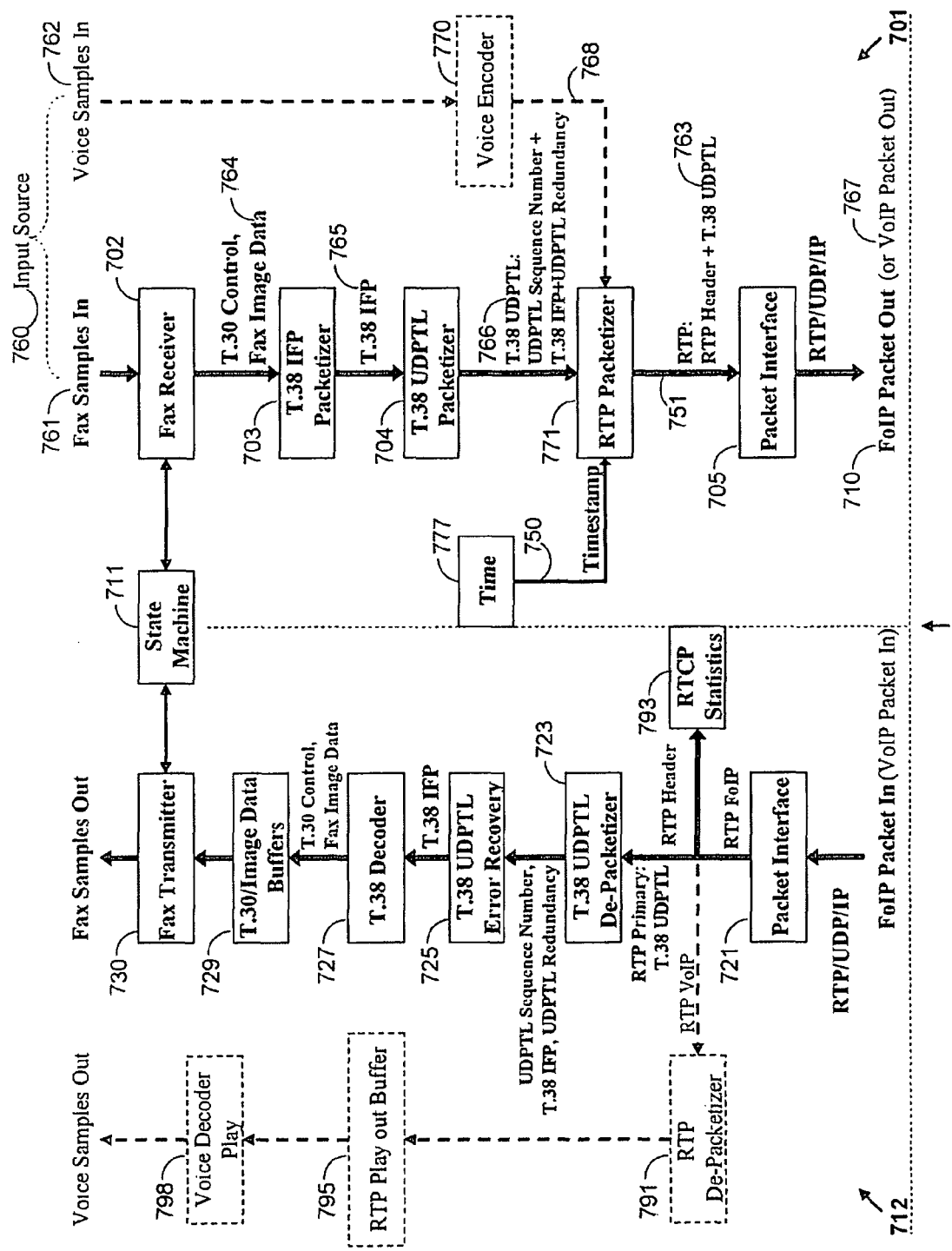
FIG. 7 shows an exemplary block diagram of a gateway for communicating a T.38 UDPTL (FoIP) packet, whose structure complies with a model such as shown in FIG. 4, and RTP packets, according to some embodiments of the present disclosure.

Referring now to FIG. 7, it shows a block diagram of a gateway for communicating a T.38 UDPTL (FoIP) packet whose structure complies with the model shown in FIG. 4, and RTP packets, according to some embodiments of the present disclosure. Inbound path 701 of gateway 700 may include units 702, 703 704 and 771 which form the fax inbound path of gateway 700. Units 702, 703 and 704 generally function in the substantially the same manner as units 502, 503 and 504, respectively, in gateway 500 of FIG. 5a. Inbound path 701 of gateway 700 also includes units 770 and 771 that form the RTP inbound path of gateway 700 and generally function in the substantially the same manner as units 570 and 571, respectively, in gateway 560 of FIG. 5b. Unit 771 (RTP Packetizer 771) may be used by both the fax inbound path and RTP inbound path (not at the same time). Fax relay State Machine 711 generally functions substantially in the same manner as State Machine 511 of FIG. 5a and State Machine 611 of FIG. 6. For RTP communications, Time 777 generally functions substantially in the same manner as Time 577 of FIG. 5b. Fax receiver 702, being a fax receiving module, generally functions substantially in the same manner as Fax receiver 502 in gateway 500 of FIG. 5a. That is, Fax receiver 702 may convert analog fax transmission (Fax Samples In 761, in this example) to a fax data set (T.30 Control and Fax Image Data 764, in this example). For FoIP packets, Packet Interface 705 generally functions substantially in the same manner as Packet Interface 505 in gateway 500 of FIG. 5a, whereas for RTP packets Packet Interface 705 generally functions substantially in the same manner as Packet Interface 580 in gateway 560 of FIG. 5b. T.38 IFP Packetizer 703, T.38 UDPTL Packetizer 704 and RTP Packetizer 771 may form an IP communication module, which may first encapsulate the fax data set (shown at 764) using a first streaming protocol (T.38 UDPTL, in this example), to obtain a fax packet (shown at 766) and then, further encapsulate the resulting encapsulated fax packet (shown at 766) using a second streaming protocol (RTP, in this example).

Outbound path 712 of gateway 700 may include units 723, 725, 727, 729 and 730, which form the fax outbound path of gateway 700 and generally function in the substantially the same manner as units 523, 525, 527, 529 and 530, respectively, in gateway 500 of FIG. 5a. Outbound path 712 of gateway 700 also includes units 791, 793, 795 and 798 that form the RTP outbound path of gateway 700 and generally function in the substantially the same manner as units 591, 593, 595 and 598, respectively, in gateway 560 of FIG. 5b. Outbound path 712 of gateway 700 also includes IP Time (not shown) that functions substantially in the same manner as IP Time 596 in gateway 560 of FIG. 5b (or as IP Time 646 in gateway 600 of FIG. 6).

For FoIP packets, Packet Interface 721 generally functions substantially in the same manner as Packet Interface 521 in gateway 500 of FIG. 5a. For RTP packets, Packet Interface 721 generally functions substantially in the same manner as Packet Interface 581 in gateway 560 of FIG. 5b. Fax Transmitter 730 generally functions substantially in the same manner as Fax Transmitter 530 in gateway 500 of FIG. 5a.

Regarding the inbound path 701 of gateway 700 of FIG. 7, the input source (at 760) for gateway 700 may either be a fax signal (Fax Samples In 761) or voice (Voice Samples In 762), which may be originated, or forwarded, from a fax machine, multimedia device (not shown) and the like. The present disclosure discloses a novel way for communicating fax communications over RTP, while RTP related data/information is communicated in a traditional way. As part of the present disclosure, whenever gateway 700 sends to an IP network (not shown) a fax data or fax related data/information, such as FoIP Packet Out 710, the payload of the RTP packet is the entire associated T.38 UDPTL packet 763, as opposed, for example, to the method shown in FIGS. 3 and 6, where the RTP payload is the basic T.38 IFP packet. That is, the T.30 control/Fax Image Data 764 is traditionally handled by T.38 IFP Packetizer 703 to generate a corresponding standard T.38 IFP packet (765). The resulting T.38 IFP packet is then handled by T.38 UDPTL Packetizer 704 to generate a corresponding T.38 UDPTL packet (at 766).

Time stamping T.38 IFP packets as shown in FIG. 6 (at 647) breaks the integrity, or traditional format, of the T.38 UDPTL packet. Therefore, eschewing such time stamping maintains the integrity of the traditional T.38 UDPTL format and, therefore, the original benefits associated with the T.38 UDPTL format. Then, the entire T.38 UDPTL packet (at 766) is RTP-encapsulated as a RTP payload by RTP Packetizer 771. The RTP encapsulation includes only one time stamping process; that is, only the entire RTP packet, with the T.38 UDPTL packet in it as its payload, is time stamped (shown as 750 in FIG. 7). The fax relay (T.38 UDPTL) packet encapsulated with RTP header by RTP Packetizer 771 is formatted according to RFC 3550. An optional encryption common for different media data may be employed on the fax relay packet before sending the fax relay packet to Packet Interface 705. The RTP redundancy per RFC 2198 or RTP FEC per RFC 2733 are not used (nor are they required) during fax relay data communication, because the error recovery data required for protecting fax relay data are transferred over T.38 UDPTL as in normal fax communications.

Regarding the outbound path 712 of gateway 700, whenever a FoIP packet, such as FoIP Packet Out 710, is received at Packet Interface 721, Packet Interface 721 de-encapsulates the FoIP packet from its IP and UDP headers, to extract the RTP packet with its payload, FoIP packet (in the form of T.38 UDPTL format) in this case. The header of the RTP packet may be used by RTCP 793 for statistics evaluations, which is a conventional feature of the RTP protocol, as explained before. The T.38 UDPTL packet may then be conventionally processed in the traditional T.38 path, which may include T.38 UDPTL De-Packetizer 723, T.38 UDPTL Error Recovery 725, T.38 Decoder 727, T.30/Image Data Buffers 729 and Fax Transmitter 730.

Whenever voice is communicated, it is processed by the gateway 700 in a traditional way. That is, the signal associated with it (Voice Samples In 762) is encoded by Voice Encoder 770, and the encoded data is forwarded (768) to RTP Packetizer 771, which forwards to Packet Interface 705 a RTP packet (at 751) consisting now of a RTP header and RTP payload that includes primary and redundancy packets, as is shown in FIG. 5*b* (but not in FIG. 7). Packet Interface 705 may then send the RTP packet (VoIP Packet Out 767), after it encapsulates it with a UDP and IP headers, to the IP network (not shown), to an intended recipient gateway.

Regarding the outbound path 712 of gateway 700, whenever a VoIP packet, such as VoIP Packet Out 767, is received at Packet Interface 721, Packet Interface 721 de-encapsulates the VoIP packet from its IP and UDP headers, to extract the RTP packet with its RTP payload, which is, in this case, a VoIP packet (in standard RTP format). RTCP 793 may use the header of the RTP packet for statistics evaluations. The RTP packet may be then conventionally processed in the traditional RTP path, which may include RTP De-Packetizer 791, Error Recovery & RTP Play out Buffer 795 and Voice Decoder (Play) 798.

As a result of the RTP de-packetization by RTP De-Packetizer 791, the transmitted RTP sequence number, RTP timestamp, and/or timestamp offsets, primary (VoIP) packet, and redundancy data or packet are extracted (shown, for example, as 594 in FIG. 5*b*) and utilized by (error recovery and) RTP Play out Buffer 795 to correct packet sequence or recover lost packets and temporarily store packets for use by Voice Decoder Play 798.

The gateway of FIG. 7 has several advantages over the prior art gateways. In respect of a gateway that includes both a fax path such as the fax (inbound and outbound) path shown in gateway 500 of FIG. 5*a*, and a RTP path such as the RTP (inbound and outbound) path shown in gateway 560 of FIG. 5*b*, the fax path and the RTP path operate independently of one another. They operate independently of one another in the sense that, once the RTP payload (whether RTP or T.38 UDPTL packet) is identified by the receiving gateway, the payload is processed in the corresponding path (RTP or T.38 UDPTL, respectively) regardless of the requirements and features of the other path (T.38 UDPTL or RTP, respectively). Therefore, the traditional benefits of each type of path are maintained. Further, fax communications, if implemented by gateways such as gateway 700 of FIG. 7, enjoy also from traditional benefits of the RTP path, such as autonomous media (payload type) switching, secure transfer and statistics evaluations.

In respect of conventional gateway 600 of FIG. 6, gateway 700 of FIG. 7 uses time stamping process, shown as 750 in FIG. 7, which is typically used in regular RTP as opposed to using a time stamping process shown at 647 and 650 in FIG. 6, which necessitates changes in T.38 IFP or both in T38 IFP and RTP Packetizers. The RTP headers of received T.38 UDPTL/RTP packets are used for RTCP statistics (793) only and omitted at the input to T.38 UDPTL De-Packetizer (723). The UDPTL sequence number, redundancy or FEC processing for protection or recovery of packet loss is typically performed by a regular T.38 UDPTL path.

In addition, encapsulating UDPTL data with RTP header results in a smaller RTP header, comparing to the size of a RTP header when the RTP header encapsulates IFP data. Generally, the more redundancy is used, the more economy the header size becomes: In IFP/RTP, the RTP header length is proportional to the redundancy level, as specified in RFC 2198, whereas in UDPTL/RTP, the RTP header has a fixed size that is defined by RFC 3550.

Regarding the novel gateway of FIG. 7, no changes are required in respect of the T.38 UDPTL standard(s) and RTP protocol(s). The novel protocol disclosed herein (for example T.38 UDPTL over RTP or T.38 UDPTL/RTP) involves relatively simple re-direction of T.38 UDPTL packets to a RTP packetizer, shown as 771 in FIG. 7, rather than directly transmitting them to a packet interface, shown as 705 in FIG. 7. When a T.38/UDPTL/RTP type packet is received at Packet Interface 721, the novel gateway (Gateway 700 of FIG. 7) redirects the RTP packet payload (primary RTP) to a T.38 UDPTL de-packetizer such as T.38 UDPTL De-Packetizer 723 of FIG. 7, instead of redirecting the entire RTP packet to a RTP de-packetizer such as RTP De-Packetizer 641 of FIG. 6.

The novel functionality of gateway 700 of FIG. 7 may be affiliated, embedded or incorporated into an Internet aware device such as Internet aware devices 113 and 114 of FIG. 1, to enable the novel streaming protocol (T.38 UDPTL over RTP type communication, for example), substantially as disclosed herein, without using a gateway such as gateways 103 or 104 of FIG. 1.

In general, the method disclosed in the present disclosure may be used to encapsulate with RTP header fax data (and/or fax related data) that may comply substantially with any fax relay protocol or standard known today or that will be devised in the future. Any fax data (and/or fax related data) encapsulated with a RTP header may be communicated over a packet switched network as a payload of a RTP packet. Preferably, the fax data within a RTP packet may be in the form of a fax packet. For example, the fax data may be processed in a T.38 path to obtain a T.38 UDPTL type fax packet (called a T.38 packet). More generally, the fax data may be processed in a FRP path to obtain a FRP type fax packet (a FRP packet). Gateway 700 is an exemplary gateway for dealing with one type of fax data (the T.38 UDPTL) whereas FIGS. 8 and 9 refer to the second type of fax data (FRP).

Figure 8:
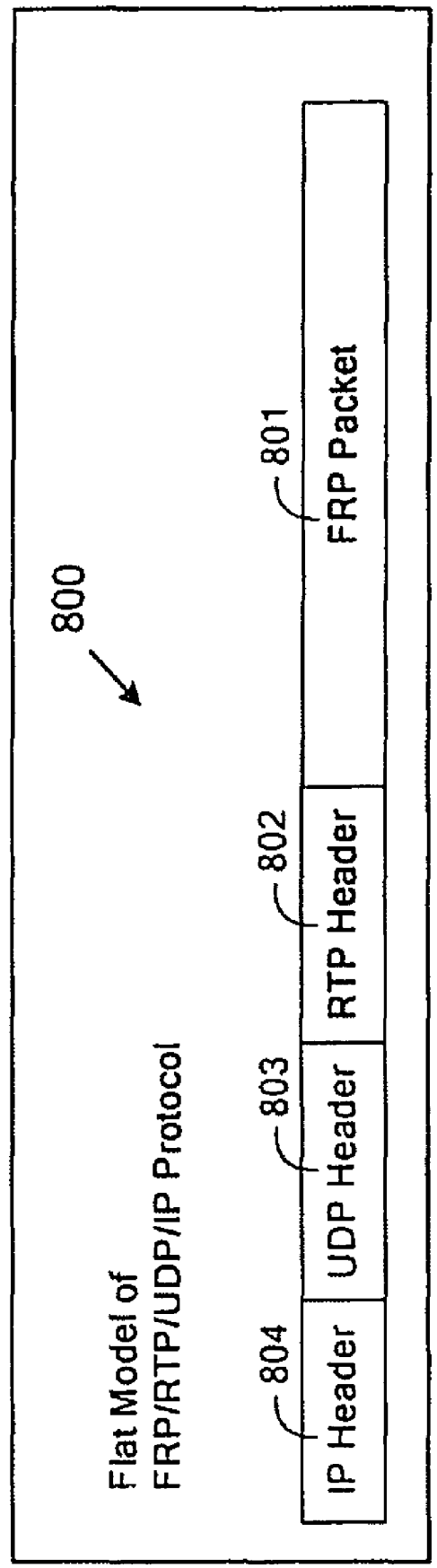
FIG. 8 shows the general structure of a FRP/RTP/UDP/IP packet.

Referring now to FIG. 8, it shows the general structure (shown at 800) of a FRP/RTP/UDP/IP packet. FRP/RTP/UDP/IP packet 800 may include a FRP packet (shown at 801) encapsulated with RTP header (shown at 802). The resulting RTP packet may be further encapsulated with UDP header (shown at 803), and then with IP header (shown at 804) for transmitting the FRP packet as a RTP packet.

Figure 9:
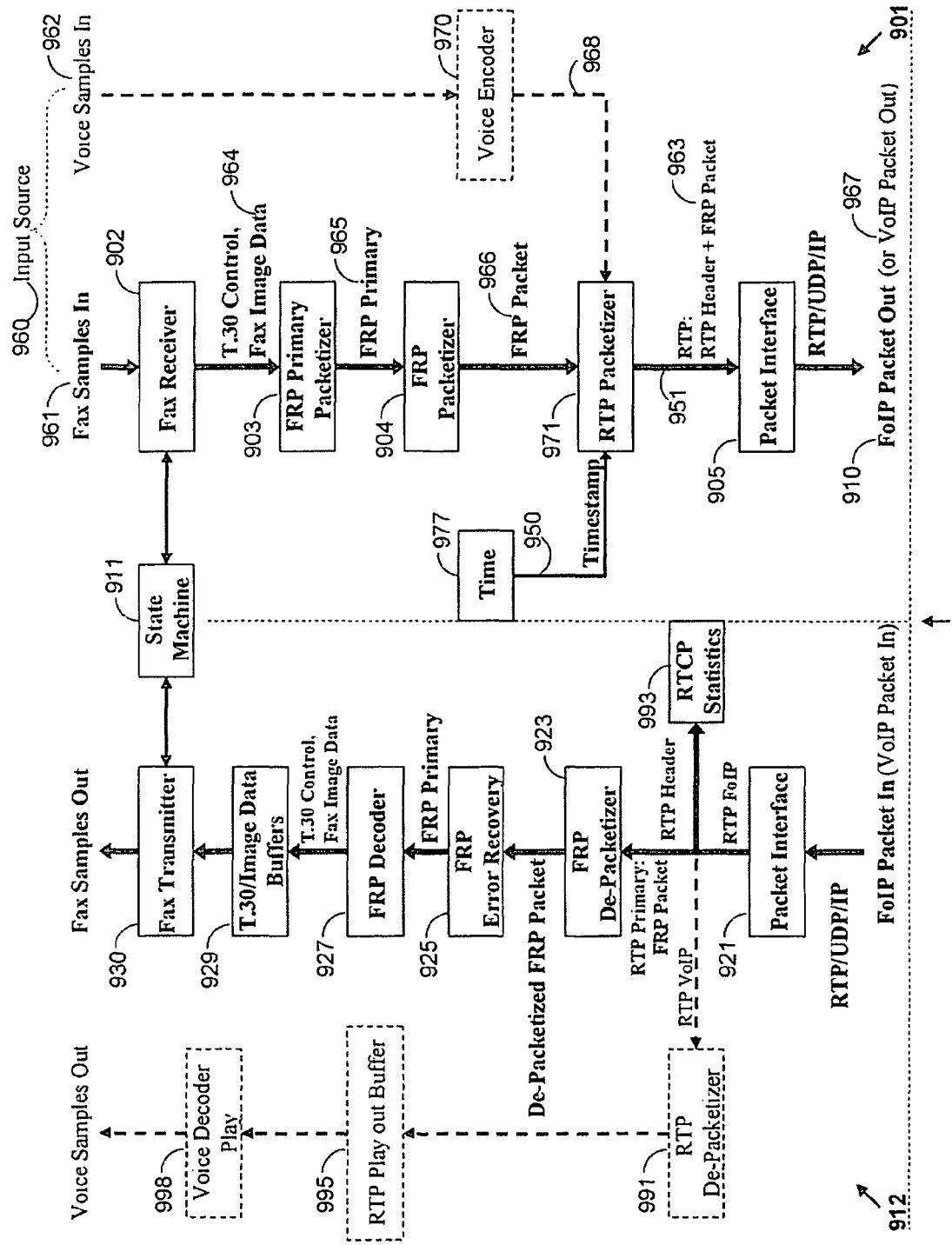
FIG. 9 shows an exemplary block diagram of a gateway for communicating a FRP (FoIP) packet, whose structure complies with a model such as shown in FIG. 8, and RTP packets, according to some embodiments of the present disclosure.

Referring now to FIG. 9, it shows an exemplary block diagram of a gateway (generally shown at 900) for communicating a FRP (FoIP) packet (whose structure complies with a model such as shown in FIG. 8) and RTP packets, according to some embodiments of the present disclosure. The layout and functionality of gateway 900 may be similar to the layout and functionality of gateway 700, except that FRP Primary 903 and FRP Packetizer 904 of FIG. 9 replace T.38 IFP Packetizer 703 and T.38 UDPTL Packetizer 704 of FIG. 7, respectively, to form an inbound FRP path that is associated with fax communication. Likewise, FRP De-Packetizer 923, FRP Error Recovery 925 and FRP Decoder 927 of FIG. 9 replace T.38 De-Packetizer 723, T.38 UDPTL Error Recovery 725 and T.38 Decoder 727 of FIG. 7, respectively, to form an outbound FRP path that is associated with fax communication.

Fax inbound path 901 of gateway 900 may include Fax Receiver 902 (being a fax receiving module), which functions in a similar manner as Fax Receiver 702 of FIG. 7, FRP Primary Packetizer 903 and FRP Packetizer 904. That is, Fax receiver 902 may convert analog fax transmission (Fax Samples In 961, in this example) to a fax data set (T.30 Control and Fax Image Data 964, in this example). FRP Primary Packetizer 903 generates from the T.30 Control and Fax Image Data 964 a corresponding FRP Primary packet (shown at 965). FRP Packetizer 904 generates a corresponding FRP Packet 966. Inbound path 901 of gateway 900 also includes units 970 and 971 that form the RTP inbound path of gateway 900 and generally function in the substantially the same manner as units 570 and 571, respectively, in gateway 560 of FIG. 5b. Unit 971 (RTP Packetizer 971) may be used by both the fax inbound path and RTP inbound path (not at the same time). State Machine 911 generally functions substantially in the same manner as State Machine 711 of FIG. 7. For RTP communications, Time 977 generally functions substantially in the same manner as Time 777 of FIG. 7. For FoIP packets, Packet Interface 905 generally functions substantially in the same manner as Packet Interface 705 in gateway 700 of FIG. 7, whereas for RTP packets Packet Interface 905 generally functions substantially in the same manner as Packet Interface 705 in gateway 700 of FIG. 7. FRP Primary Packetizer 903, FRP Packetizer 904 and RTP Packetizer 971 may form an IP communication module, which may first encapsulate the fax data set (shown at 964) using a first streaming protocol (FRP, in this example), to obtain a fax packet (shown at 966) and then, further encapsulate the resulting encapsulated fax packet (shown at 966) using a second streaming protocol (RTP, in this example).

Fax outbound path 912 of gateway 900 may include units 923, 925, 927, 929 and 930. Outbound path 912 of gateway 900 also includes units 991, 993, 995 and 998 that form the RTP outbound path of gateway 900 and generally function in the substantially the same manner as units 791, 793, 795 and 798, respectively, in gateway 700 of FIG. 7. Outbound path 912 of gateway 900 also includes IP Time (not shown) that functions substantially in the same manner as IP Time 596 in gateway 560 of FIG. 5b (or as IP Time 646 in gateway 600 of FIG. 6). For FoIP packets, Packet Interface 921 generally functions substantially in the same manner as Packet Interface 721 in gateway 700 of FIG. 7. For RTP packets, Packet Interface 921 generally functions substantially in the same manner as Packet Interface 721 in gateway 700 of FIG. 7. Fax Transmitter 930 generally functions substantially in the same manner as Fax Transmitter 730 in gateway 700 of FIG. 7.

Regarding inbound path 901 of gateway 900 of FIG. 9, the input source (at 960) for gateway 900 may either be a fax signal (Fax Samples In 961) or voice (Voice Samples In 962), which may be originated, or forwarded, from a fax machine, multimedia device (not shown) and the like. Like gateway 700, gateway 900 is designed to communicate fax communications over RTP, while RTP related data/information is communicated in a traditional way. As part of the present disclosure, whenever gateway 900 sends to an IP network (not shown) a fax data or fax related data/information, such as FoIP Packet Out 910, the payload of the RTP packet is the entire associated FRP packet 963. That is, the T.30 control/Fax Image Data 964 is traditionally handled by FRP Primary Packetizer 903 to generate a corresponding standard FRP primary packet (shown at 965), which is further packetized by FRP Packetizer 904 to generate a corresponding FRP packet (shown at 966).

Regarding outbound path 912 of gateway 900, whenever a FoIP packet, such as FoIP Packet Out 910, is received at Packet Interface 921, Packet Interface 921 de-encapsulates the FoIP packet from its IP and UDP headers, to extract the RTP packet with its payload, FoIP packet (in the form of FRP format) in this case. The header of the RTP packet may be used by RTCP 993 for statistics evaluations, which is a conventional feature of the RTP protocol, as explained earlier. The FRP packet may then be conventionally processed in the traditional FRP path, which may include FRP De-Packetizer 923, FRP Error Recovery 925, FRP Decoder 927, T.30/Image Data Buffers 929 and Fax Transmitter 930.

Whenever voice is communicated, it is processed by the gateway 900 in a traditional way. That is, the signal associated with it (Voice Samples In 962) is encoded by Voice Encoder 970, and the encoded data is forwarded (shown at 968) to RTP Packetizer 971, which forwards to Packet Interface 905 a RTP packet (shown at 951) consisting now of a RTP header and RTP payload that includes primary and optional redundancy packets, as is shown, for example, in FIG. 5b (572 and 576, respectively). Packet Interface 905 may then send the RTP packet (VoIP Packet Out 967), after it encapsulates it with a UDP and IP headers, to the IP network (not shown), to an intended recipient gateway or other recipient device.

Regarding the outbound path 912 of gateway 900, whenever a VoIP packet, such as VoIP Packet Out 967, is received at Packet Interface 921, Packet Interface 921 de-encapsulates the VoIP packet from its IP and UDP headers, to extract the RTP packet with its RTP payload, which is, in this case, a VoIP packet (in standard RTP format). RTCP 993 may use the header of the RTP packet for statistics evaluations. The RTP packet may be then conventionally processed in the traditional RTP path, which may include RTP De-Packetizer 991, RTP Play out Buffer 995 and Voice Decoder Play 998.

As a result of the RTP de-packetization by RTP De-Packetizer 991, the transmitted RTP sequence number, RTP timestamp, and/or timestamp offsets, primary (VoIP) packet, and redundancy data or packet are extracted (shown, for example, as 594 in FIG. 5b) and utilized by (error recovery and) RTP Play out Buffer 995 to correct packet sequence or recover lost packets and temporarily store packets for use by Voice Decoder Play 998. A gateway such as gateway 900 has several advantages over the prior art gateways, which are similar to the advantages described in connection with gateway 700 FIG. 7.

Regarding the novel gateway of FIG. 9, no changes are required in respect of the FRP standard(s) and RTP protocol(s). The novel protocol disclosed herein (FRP over RTP, or FRP/RTP) involves relatively simple re-direction of FRP packets to a RTP packetizer, shown as 971, rather than directly transmitting them to a packet interface, shown as 905. When a FRP/RTP type packet is received at Packet Interface 921, gateway 900 redirects the RTP packet payload (primary RTP) to a FRP de-packetizer such as FRP De-Packetizer 923, instead of redirecting the entire RTP packet to a RTP de-packetizer such as RTP De-Packetizer 991.

Like gateway 700 of FIG. 7, the novel functionality of gateway 900 of FIG. 9 may be affiliated, embedded or incorporated into an Internet aware device such as Internet aware devices 113 and 114 of FIG. 1, to enable the novel FRP over RTP type communication, substantially as disclosed herein, without using a gateway such as gateways 103 or 104 of FIG. 1. In addition, a gateway such as gateway 700 of FIG. 7 or gateway 900 of FIG. 9, may include controller may be adapted While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed:

1. A gateway comprising:
   a fax receiving module to convert an analog fax transmission to a fax data set; and
   an Internet Protocol (IP) communication module (a) to encapsulate said fax data set using a first streaming transport protocol and (b) to further encapsulate the encapsulated fax data set using a second streaming transport protocol,
   wherein the first streaming transport protocol comprises a Fax Relay Protocol (FRP) selected from the group consisting of:
   (1) T.38 User Datagram Protocol Transport Layer (UDPTL);
   (2) an enhanced T.38 UDPTL;
   wherein the second streaming transport protocol comprises a real-time transport protocol,
   wherein a twice-encapsulated packet, comprising said fax data set firstly encapsulated using the Fax Relay Protocol and further encapsulated using the real-time transport protocol, comprises properties of the first and second streaming transport protocols, wherein said twice-encapsulated packet is to be either transferred to or received from a switched packet network over User Datagram Protocol and Internet Protocol (UDP/IP).

2. The gateway according to claim 1, wherein the receiving module and the IP communication module form an inbound fax path adapted to receive the analog fax transmission, generate a fax packet from said analog fax transmission and encapsulate said fax packet using said real-time transport protocol.

3. The gateway of claim 2, wherein the inbound fax path is a fax relay protocol path and the fax packet is a fax relay protocol packet.

4. The gateway of claim 3, wherein the inbound fax relay protocol path comprises:
   a fax receiver adapted to generate a fax data set from an analog fax transmission;
   a fax relay protocol primary packetizer coupled to said fax receiver and adapted to generate a fax relay protocol primary packet from said fax data set;
   a fax relay protocol packetizer coupled to said fax relay protocol primary packetizer and adapted to generate a fax relay protocol packet from said fax relay protocol primary packet; and
   a real-time transport protocol packetizer adapted to encapsulate said fax relay protocol packet.

5. The gateway of claim 2, wherein the fax relay protocol is a T.38 User Datagram Protocol Transport Layer (UDPTL) protocol, wherein the inbound fax path is a T.38 path, and the fax packet is a T.38 UDPTL packet.

6. The gateway of claim 5, wherein the inbound T.38 path comprises:
   a fax receiver adapted to generate the fax data set from the received analog fax transmission;
   a T.38 Internet Fax Protocol (IFP) packetizer coupled to said fax receiver and adapted to generate T.38 IFP packet from said fax data set;
   a T.38 UDPTL packetizer coupled to said T.38 IFP packetizer and adapted to generate T.38 UDPTL packet from said T.38 IFP packet; and
   a real-time transport protocol packetizer adapted to encapsulate said fax relay protocol packet.

7. The gateway of claim 2, further comprising an inbound real-time transport protocol path, wherein said inbound real-time transport protocol path comprises:
   a voice encoder adapted to generate an encoded data relating to an input voice/audio signal; and
   a real-time transport protocol packetizer coupled to said voice encoder and adapted to generate real-time transport protocol packets by encapsulating portions of said encoded data with respective real-time transport protocol headers.

8. The gateway of claim 2, further comprising:
   a transmitting module, wherein said transmitting module and the IP communication module form an outbound fax path adapted to use the second streaming transport protocol to de-encapsulate a fax packet that includes an encapsulated fax data set, and to further de-encapsulate said encapsulated fax data set using the first streaming transport protocol.

9. The gateway of claim 8, wherein the outbound fax path is a fax relay protocol path and the fax packet is a fax relay protocol packet.

10. The gateway of claim 9, wherein the outbound fax relay protocol path is adapted to de-encapsulate a real-time transport protocol encapsulated fax relay protocol packet, and to process the fax relay protocol packet in said fax relay protocol path for generating a corresponding fax signal.

11. The gateway of claim 9, wherein the outbound fax relay protocol path comprises:
    a packet interface and a real-time transport protocol de-packetizer adapted to use the second streaming transport protocol to de-encapsulate the fax relay protocol packet to obtain encapsulated fax data set;
    a fax relay protocol de-packetizer adapted to use the first streaming transport protocol to de-encapsulate said encapsulated fax data set;
    a fax relay protocol decoder coupled to said fax relay protocol de-packetizer and adapted to decode said fax data set; and a fax transmitter adapted to generate from said fax data set and output an analog fax signal.

12. The gateway of claim 9, wherein the fax relay protocol is T.38 UDPTL, wherein the outbound fax relay protocol path is an outbound T.38 path, and the fax relay protocol packet is a T.38 UDPTL packet.

13. The gateway of claim 12, wherein the outbound T.38 path is adapted (a) to de-encapsulate a real-time transport protocol encapsulated T.38 UDPTL packet, and (b) to process the T.38 UDPTL packet in said outbound T.38 path for generating a corresponding fax signal.

14. An apparatus for transmitting fax data over a switched packet network, the apparatus comprising:
a controller to encapsulate a fax data set, to obtain a fax packet, using a first streaming transport protocol, and to further encapsulate said fax packet using a second streaming transport protocol,
wherein the first streaming transport protocol comprises a Fax Relay Protocol (FRP) selected from the group consisting of:
(1) T.38 User Datagram Protocol Transport Layer (UDPTL);
(2) an enhanced T.38 UDPTL;
wherein the second streaming transport protocol comprises a real-time transport protocol,
wherein a twice-encapsulated packet comprising said fax data set firstly encapsulated using the fax relay protocol and further encapsulated using the real-time transport protocol comprises properties of the first and second streaming transport protocols,
wherein said twice-encapsulated packet is transferred to a switched packet network over User Datagram Protocol and Internet Protocol (UDP/IP).

15. The apparatus according to claim 14, wherein the fax relay protocol is T.38 User Datagram Protocol Transport Layer (UDPTL) protocol and the fax packet is a T.38 UDPTL packet.

16. An apparatus for receiving fax data over a switched packet network, the apparatus comprising:
a controller adapted to extract a fax packet using a first streaming transport protocol, and to extract from said fax packet a data set using a second streaming transport protocol,
wherein the second streaming transport protocol comprises a fax relay protocol having an error-correction scheme for recovery of lost data and out-of-order data,
wherein the first streaming transport protocol comprises a real-time transport protocol,
wherein the second streaming transport protocol comprises a Fax Relay Protocol (FRP) selected from the group consisting of:
(1) T.38 User Datagram Protocol Transport layer (UDPTL);
(2) an enhanced T.38 UDPTL;
wherein a twice-encapsulated packet comprising said fax data set encapsulated using the fax relay protocol and further encapsulated using the real-time transport protocol comprises properties of the first and second streaming transport protocols,
wherein the controller is to utilize Internet Protocol (IP) and User Datagram Protocol (UDP) to receive said twice-encapsulated packet from a switched packet network,
wherein the controller is to utilize the real-time transport protocol to de-encapsulate said twice-encapsulated packet to extract said fax relay protocol packet from a real-time transport protocol packet,
wherein the controller is to utilize the Fax Relay Protocol to further de-encapsulate the extracted fax relay protocol packet to further extract said fax data set from said fax relay protocol packet.

17. The apparatus according to claim 16, wherein the fax relay protocol is T.38 UDPTL protocol and the fax packet is a T.38 UDPTL packet.

18. A method of transmitting a fax data set over a switched packet network, the method comprising:
encapsulating a fax data set using a first streaming transport protocol to obtain a fax packet, and further encapsulating said fax packet using a second streaming transport protocol,
wherein the first streaming transport protocol comprises a Fax Relay Protocol (FRP) selected from the group consisting of:
(1) T.38 User Datagram Protocol Transport Layer (UDPTL);
(2) an enhanced T.38 UDPTL;
wherein the second streaming transport protocol comprises a real-time transport protocol,
wherein a twice-encapsulated packet comprising said fax data set firstly encapsulated using the fax relay protocol and further encapsulated using the real-time transport protocol comprises properties of the first and second streaming transport protocols,
wherein said twice-encapsulated packet is transferred to a switched packet network over User Datagram Protocol and Internet Protocol (UDP/IP).

19. The method according to claim 18, wherein the fax relay protocol is T.38 UDPTL protocol and the fax packet is a T.38 UDPTL packet.

20. A method of receiving a fax data set from a switched packet network, the method comprising:
using Internet Protocol (IP) and User Datagram Protocol (UDP) to receive a twice-encapsulated packet from the switched packet network;
using a first streaming transport protocol to de-encapsulate the received twice-encapsulated packet to obtain a fax packet, and
using a second streaming transport protocol to de-encapsulate said fax packet to obtain a fax data set,
wherein the first streaming transport protocol comprises a real-time transport protocol,
wherein the second streaming transport protocol comprises a
Fax Relay Protocol (FRP) selected from the group consisting of:
(1) T.38 User Datagram Protocol Transport Layer (UDPTL);
(2) an enhanced T.38 UDPTL;
wherein the twice-encapsulated packet comprising said fax data set encapsulated using the Fax Relay Protocol and further encapsulated using the real-time transport protocol comprises properties of the first and second streaming transport protocols.

21. The method according to claim 20, wherein the fax relay protocol is T.38 UDPTL protocol and the fax packet is a T.38 UDPTL packet.

* * * * *